United States Patent [19]

Morita et al.

[11] Patent Number: 4,846,578
[45] Date of Patent: Jul. 11, 1989

[54] SURFACE CHARACTERISTIC MEASUREMENT

[75] Inventors: Misao Morita, Kobe; Takashi Nakajima, Ashiya, both of Japan

[73] Assignee: Nippon Paint Co., Ltd., Osaka, Japan

[21] Appl. No.: 76,715

[22] Filed: Jul. 20, 1987

Related U.S. Application Data

[63] Continuation-in-part of Ser. No. 585,216, Feb. 28, 1984, abandoned, which is a continuation-in-part of Ser. No. 446,214, Dec. 2, 1982, abandoned.

[30] Foreign Application Priority Data

Dec. 5, 1981 [JP] Japan ............................... 195983

[51] Int. Cl.$^4$ ............................................. G01N 21/32
[52] U.S. Cl. .................................. 356/446; 356/124.5
[58] Field of Search .............................. 356/446, 124.5

[56] References Cited

U.S. PATENT DOCUMENTS 3,250,177 5/1966 Shack ............................... 356/124.5
3,771,879 11/1973 Chambu et al. .................. 356/124.5

FOREIGN PATENT DOCUMENTS 71289 6/1977 Japan .............................. 356/446

OTHER PUBLICATIONS

Jhiry, H., "Measurements of Modulation Transfer Function", Rev. H. F., vol. 8, No. 3 (1970), pp. 73–76.
Fisher et al., "Laboratory Determination of Modulation Transfer Function from Line Spread Function", *Chrysler Defense Engineering*, 1967.
Pospišil et al., "Measurement of the Modulation Transfer Function of Focusing Screens" *Optica Acta* vol 19, No. 7 (1972), pp. 593–604.

*Primary Examiner*—Richard A. Rosenberger
*Attorney, Agent, or Firm*—Wenderoth, Lind & Ponack

[57] ABSTRACT

The measurement of surface characteristics such as distinctness-of-image glossiness and/or surface roughness of a sample is carried out by projecting an image of a pattern, reflected from the surface of the sample, onto an image forming plane, transforming the spatial distribution of the intensity of light on the image forming plane according to Fourier series, and quantifying the distinctness-of-image glossiness or the surface roughness according to the light power strength at a particular spatial frequency.

31 Claims, 18 Drawing Sheets

Visual Estimation

Roughness Ra.

Low ← Glossiness → High

Spatial Distance (×0.028mm)

Spatial Freq. $(\times \frac{1000}{511 \times 28} \cdot \frac{1}{mm})$

SURFACE CHARACTERISTIC MEASUREMENT

This application is a continuation-in-part of U.S. patent application Ser. No. 585,216, filed on Feb. 28, 1984, now abandoned, which is a continuation-in-part of U.S. pat. application Ser. No. 446,214, filed on Dec. 2, 1982, now abandoned, in the name of the same inventors.

BACKGROUND OF THE INVENTION

The present invention generally relates to the measurement of surface characteristics and, more particularly, to a method of and an apparatus for measuring surface characteristics, especially the surface glossiness and the surface roughness, of a workpiece such as a coating or a metal.

The glossiness and the surface roughness are one of the important factors determinative of surface characteristics of a workpiece and, in evaluating the finish of particularly a coating on the surface of the workpiece, the both are considered important characteristics to be taken into consideration. JIS (Japanese Industrial Standards)-Z-8741 stipulates the methods for the measurement of glossiness and generally defines two types of glossiness, the physically determinable glossiness including the specular glossiness and the contrast glossiness, and the psychologically determinable glossiness including the distinctness-of-image glossiness. As compared with the specular and contrast glossinesses, the distinctness-of-image glossiness is still based on the visual inspection. According to the JIS-Z-8741, the distinctness-of-image glossiness is defined as meaning the extent to which the image of an object reflects on the surface to be tested.

Based on this definition, various instruments for the measurement of the distinctness-of-image glossiness have hitherto deviced. One of them is disclosed in, for example, the Japanese Utility Model Publication No. 41-19039 published in 1966. The measuring instrument disclosed in the above mentioned publication is effective to present, in the form of a numerical value, the extent to which the image of each of character patterns of different size reflected on the surface to be tested can be discerned. However, since it has been found that the measured values differ from person to person and that the resolution of the measured values is not good, the measuring apparatus has not been used so often.

Another example disclosed in, for example, the Japanese Laid-open Patent Publication No. 50-153979, laid open to public inspection in 1975, discloses a method comprising causing the image of a pattern having sharply divided light and dark areas to be reflected from the surface to be tested, focusing the reflected image on a focal plane, and presenting, in the form of a numerical value, any change in intensity of light received from the light and dark areas of the focused image of the pattern. However, this known method has some disadvantages in that the measured value is directly affected by change in intensity of the light received due to change in reflectance of the surface to be tested, and in that, since the pattern of distribution of the intensity of light received does not represent a monotonous decrease affected by characteristics, such as roughness, of the surface to be tested, a lot of difficulties are involved in signal processing necessary to present the distinctness-of-image glossiness in the form of a numerical value based on the rate of change in intensity of the light received.

The Japanese Laid-open Patent publication No. 52-138960, laid open to public inspection in 1977, discloses a distinctness-of-image glossmeter of a construction as shown in FIG. 1 of the accompanying drawings. Referring to FIG. 1, the glossmeter disclosed therein comprises an optical system including a light source 1, a slit 2 and a lens 3 and is so designed as to project collimated beams of light onto the surface to be tested at an angle of incidence of 45° or 60°. Depending on the contour of the surface to be tested, the light reflected therefrom may scatter. The glossmeter of the above described construction serves to optically measure the extent to which the image of the slit reflected from the surface to be tested can be visible on a pattern 6, and the distinctness-of-image glossiness measured by the glossmeter shown in FIG. 1 can be calculated from the following equation wherein M represents the maximum value of the light transmitted through a light area on the pattern 6 and m represents the minimum value at a dark area of the same.

$$C = (M-m)/(M+m) \times 100\%$$

The larger the value of C, the higher the distinctness-of-image. Conversely, the smaller the value of C, the lower the distinctness-of-image. However, this prior art glossmeter has been found having disadvantages in that the measured values tend to be adversely affected by the ambient rays of light and in that, since the image of the slit projected onto the pattern tends to fail to align with the aperture of a light receptor 7 in the event of the presence of a warp and/or a curve on the surface to be tested, the measurements are adversely affected or are difficult to perform.

SUMMARY OF THE INVENTION

Accordingly, the present invention has been developed with a view to substantially eliminating the disadvantages and inconveniences inherent in the prior art measurement of the distinctness-of-image glossiness and has for its essential object to substantially eliminate any possible human intervention in the measured values, and also to minimize any possible influence the presence of a warp and/or a curve on the surface to be tested, the ambient rays of light and the difference in reflectance of the surface to be tested may bring about on the measurements.

Another object of the present invention is to provide a method of an apparatus for the measurement of the surface characteristics which can give a relatively high resolution.

A further object of the present invention is to provide a method of an apparatus for the measurement of the surface characteristics, which can be effective of quantity the measurements with no difficulty.

The present invention has its starting point lying in that the surface characteristics, for example, the distinctness-of-image glossiness, of the surface to be tested can be evaluated by examining the extent to which the edge of a pattern having a combination of light and dark areas can be sharply projected on the surface to be tested, in that the sharpness of the pattern of distribution of the light on an image forming plane on which the image of the pattern having a combination of light and dark areas reflected from the surface to be tested is focused has an influential correlation with the sharpness of the edge of the pattern having a combination of light and dark areas projected on the surface to be tested, and in that, as the sharpness of the above described pattern of distribution of the light, when its spatial frequency is analyzed, tends to be dominated by a high frequency component. Accordingly, in order to accomplish the above described objects, and the other objects which will become clear subsequently, of the present invention, the latter provides a method which comprises projecting an image of a pattern having a combination of light and dark areas reflected from the surface to be tested onto an image plane by the use of an image forming optical system to form the image of the pattern having a combination of light and dark areas on the image forming plane, transforming the spatial distribution of the intensity of light on the image forming plane according to Fourier's series, and quantifying the distinctness-of-image glossiness or the surface roughness of the surface to be tested according to the intensity of a light power at a particular spatial frequency.

According to the present invention, an apparatus effective to accomplish the objects of the present invention referred to hereinbefore comprises an illuminating optical system for illuminating a pattern having a combination of light and dark areas from rear, an image forming optical system for projecting the image of the pattern having a combination of light and dark areas, which has been reflected from the surface to be tested, onto an image forming plane to form the image of the pattern having a combination of light and dark areas on the image forming plane, a photoelectric element for converting the spatial distribution of the intensity of light on the image forming plane into an electric signal, and a data processing system for transforming the electric signal from the photoelectric element according to Fourier's series to determine the intensity of a light power at a particular spatial frequency, thereby to quantify the distinctness-of-image glossiness or the surface roughness according to the intensity of the light power so determined at the particular spatial frequency.

BRIEF DESCRIPTION OF THE DRAWINGS

These and other objects and features of the present invention will become clear from the subsequent description of the present invention taken in conjunction with preferred embodiments thereof with reference to the accompanying drawings, in which:

FIGS. 39, 40 and 41 are diagrams each showing the relationship between the inclination of the paint coating surface and the angle of inclination.

DETAILED DESCRIPTION OF THE EMBODIMENTS

Figure 1:
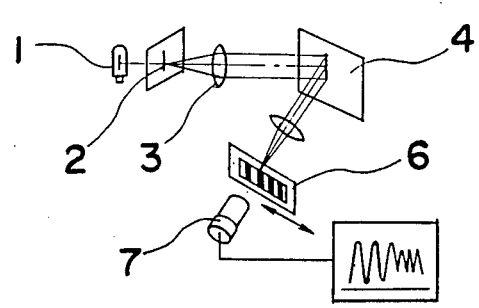
FIG. 1 is a schematic diagram showing the principle of the prior art distinctness-of-image glossmeter.

Before the description of the present invention proceeds, it is to be noted that like parts are designated by like reference numerals throughout the accompanying drawings.

Figure 2:
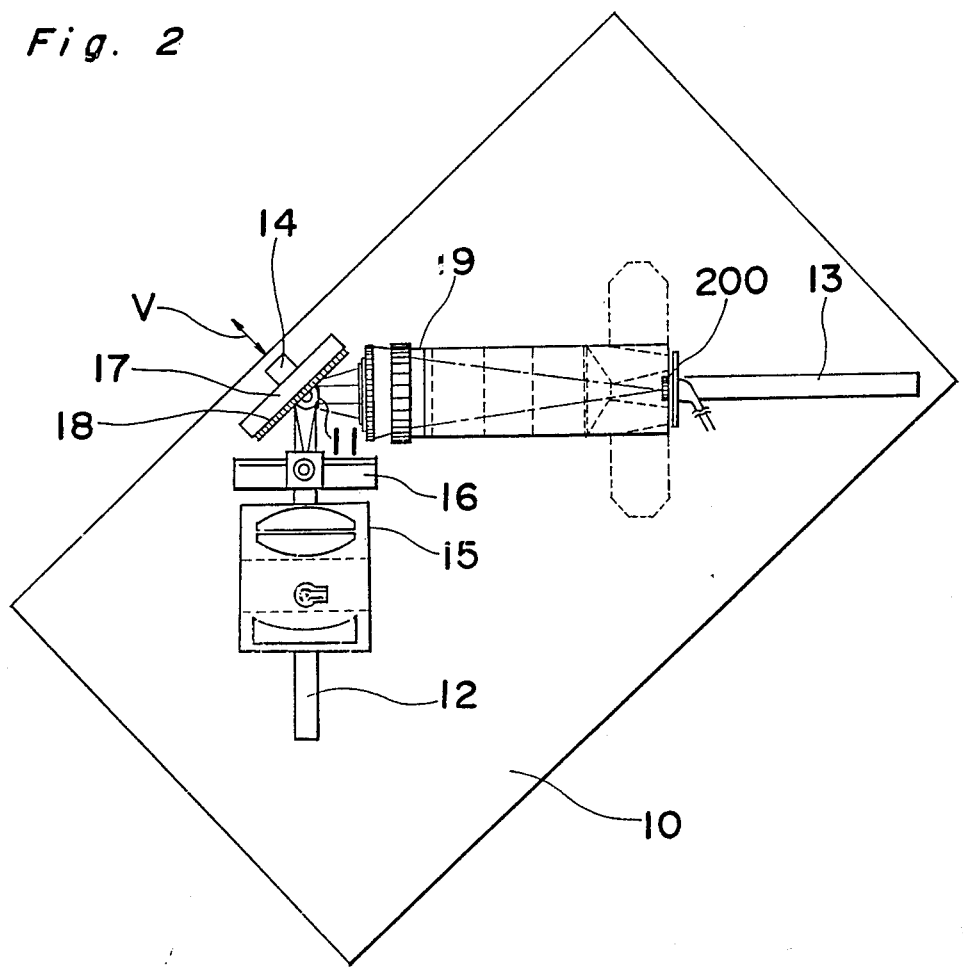
FIG. 2 is a diagram showing a first embodiment of the present invention.

Referring first to FIG. 2, an optical bench 10 has guide rails 12 and 13 and a finely adjustable stage 14 all mounted thereon for pivotal movement about a rotary shaft connector 11. The guide rail 12 has mounted thereon a slit 16 extending in a direction parallel to a paper surface and having a slit width adjustable within the range of 0.1 to 2 mm, and a light source 15 for illuminating the slit 16. On the other hand, the guide rail 13 has mounted thereon a projecting and image forming lens assembly 19, and a one-dimensional solid image sensor 200 (for example, a photodiode array comprised of a single row of 512 photo-diodes spaced an equal distance of 28 $\mu$m from each other) having its light receiving surface lying perpendicular to the paper surface. Both of the guide rails 12 and 13 have a distance scale calibrated over the length thereof so that the respective positions of the light source 15 and slit 16 movably mounted on the guide rail 12 and that of the lens assembly 19 and image sensor 200 also movably mounted on the guide rail 13 can be read out. The guide rails 12 and 13 are so connected to the connector 11 that any one of the angle formed between the direction of movement of the stage 14 as shown by the arrow V and the guide rail 12 and that between the direction of movement of the stage 14 and the guide rail 13 can be adjusted within the range of 20° to 80°, and such angle when adjusted can be read out from the angle scale calibrated on the connector 11. The stage 14 is provided with a sample holder 17 for supporting a sample 18 to be tested in a manner with its surface lying perpendicular to the direction of movement of the stage 14.

Figure 3:
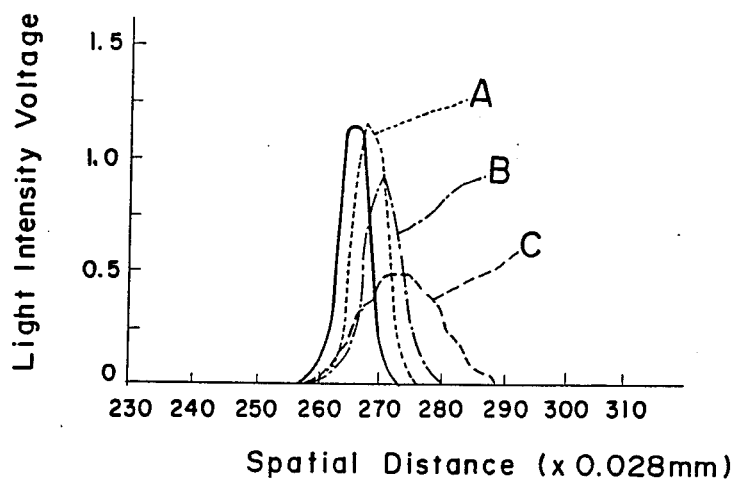
FIG. 3 is a graph showing the spatial distribution of the intensity of light on an image forming plane.

Although the pattern of spatial distribution of the intensity of light at the slit 16 can be considered an ideal rectangular wave, in the case where the image of the pattern of this ideal rectangular wave is projected and formed by the lens assembly through the reflection on the surface of the sample 18, it diffuses or scatters depending on the surface contour of the sample 18 with the waveform of the ideal rectangular wave consequently getting out of shape, but the example wherein the sample 18 is employed in the form of coated material is shown in FIG. 3. In FIG. 3, axis of abscissa represents the spatial distance in a direction perpendicular to the paper surface forming the image forming plane where the image sensor 200 is located and the axis of ordinates represents the intensity of light.

Figure 4:
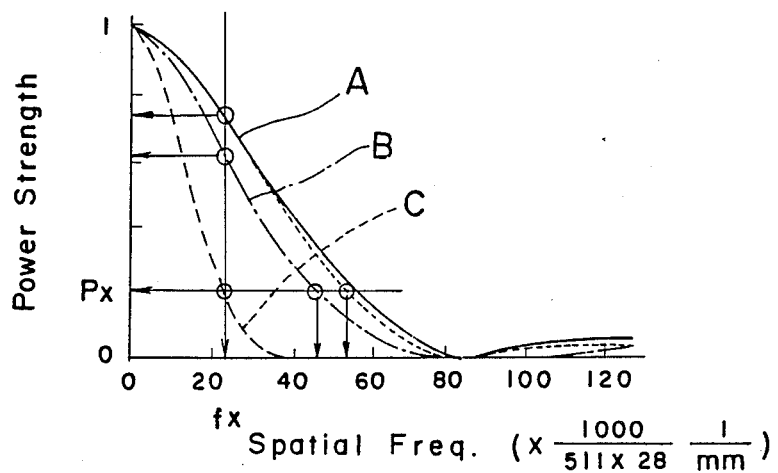
FIG. 4 is a graph showing the power spectrum of the spatial distribution of the light intensity shown in FIG. 3.

As a technique for presenting the pattern of the image projected and, hence, formed, the theory of Fourier series in which the intensity of spatial high frequency component is said to be high with the pattern in which the boundary between light and dark areas of the pattern of the image so projected and, hence, formed varies sharply is applied for transforming the spatial distribution of the light intensity of calculate the power spectrum generalized according to the intensity of a direct current component so that the power strength at a particular spatial frequency of the power spectrum can provide an indication of the distinctness-of-image glossiness. FIG. 4 shows an example of the power spectrum data calculated from the data of the spatial distribution of the light intensity shown in FIG. 3. In FIG. 4, the axis of abscissa represents the spatial frequency and the axis of ordinates represents the power strength wherein the intensity of the direct current component is taken as 1, and the data shown by A, B and C correspond respectively to the data shown by A, B and C in FIG. 3. As shown in FIG. 4, it will be clear that the distinctness-of-image glossiness can be quantified by the light power strength at a suitable spatial frequency fx, the spatial frequency at which the light power strength attains a particular value Px, the sum of the light power strengths at a plurality of particular spatial frequencies, or the integrated value of light power strengths within a particular range of spatial frequency.

Figure 5:
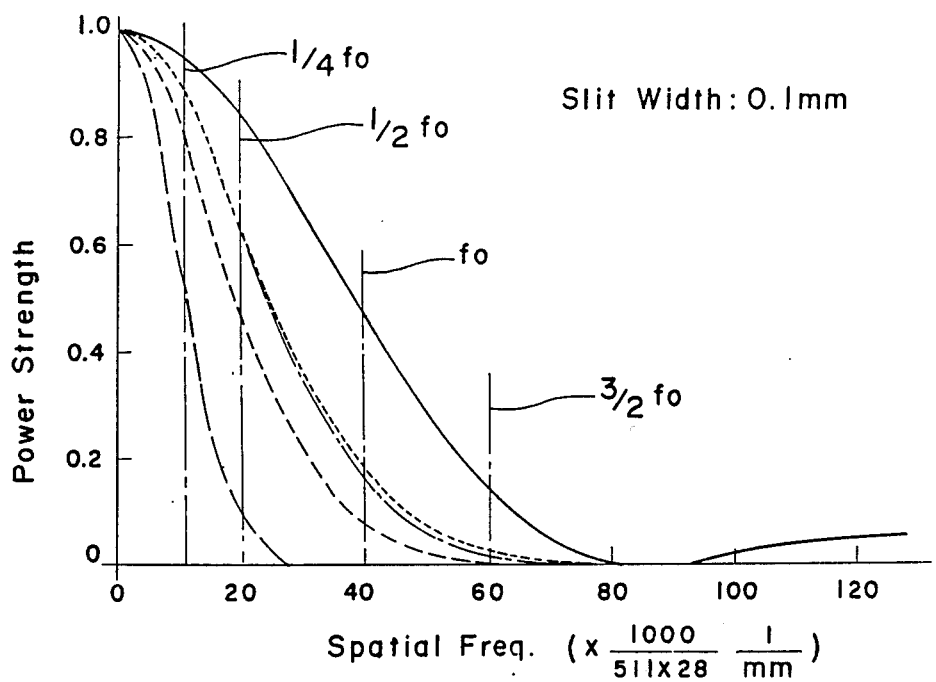
FIGS. 5, 6, 7, 8 and 9 are graphs showing different power spectra according to different embodiments of the present invention, respectively.
Figure 6:
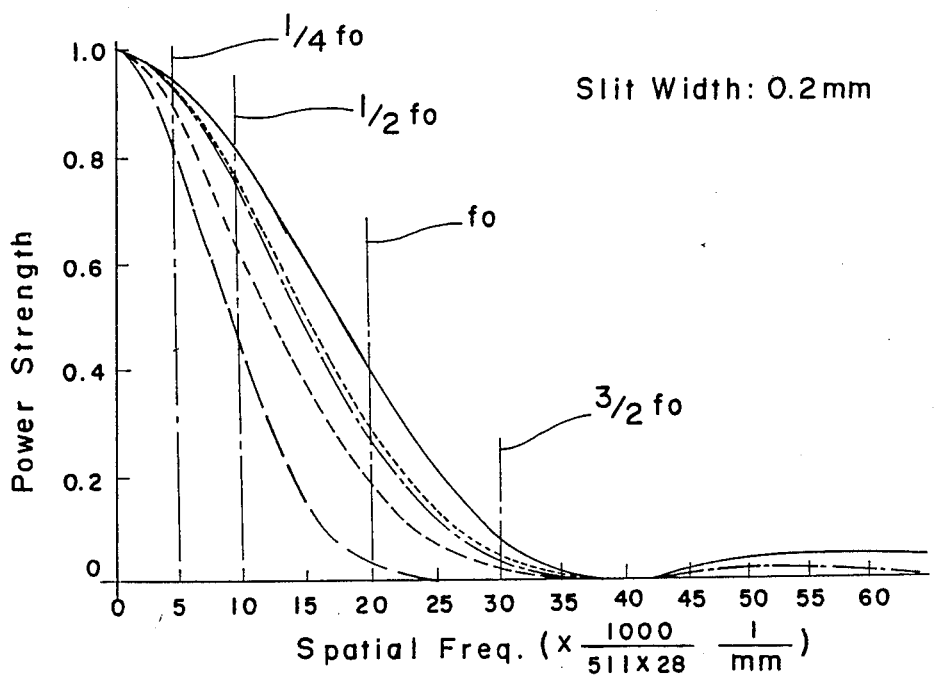
Figure 7:
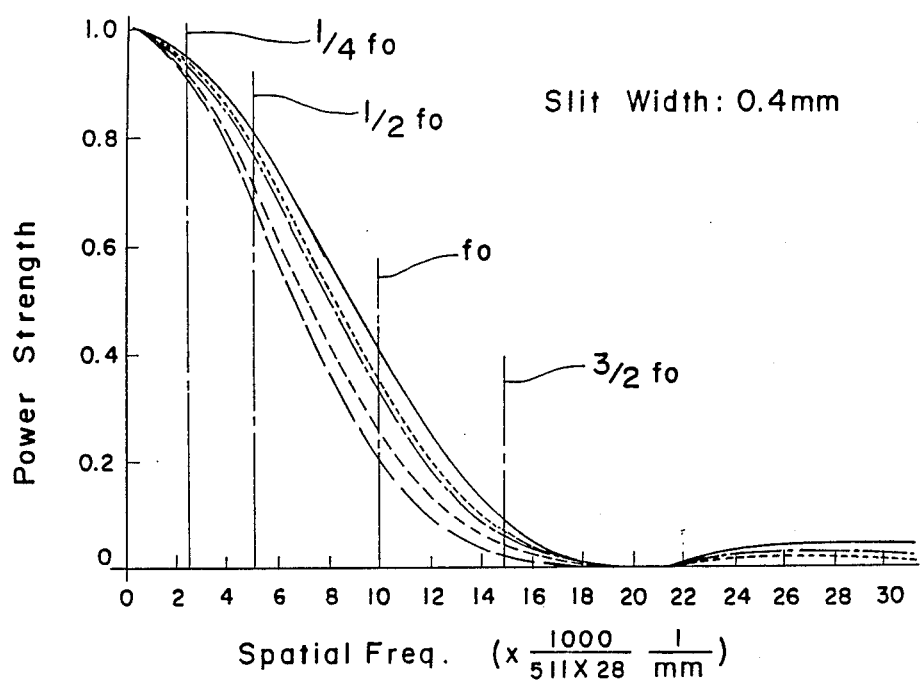
Figure 8:
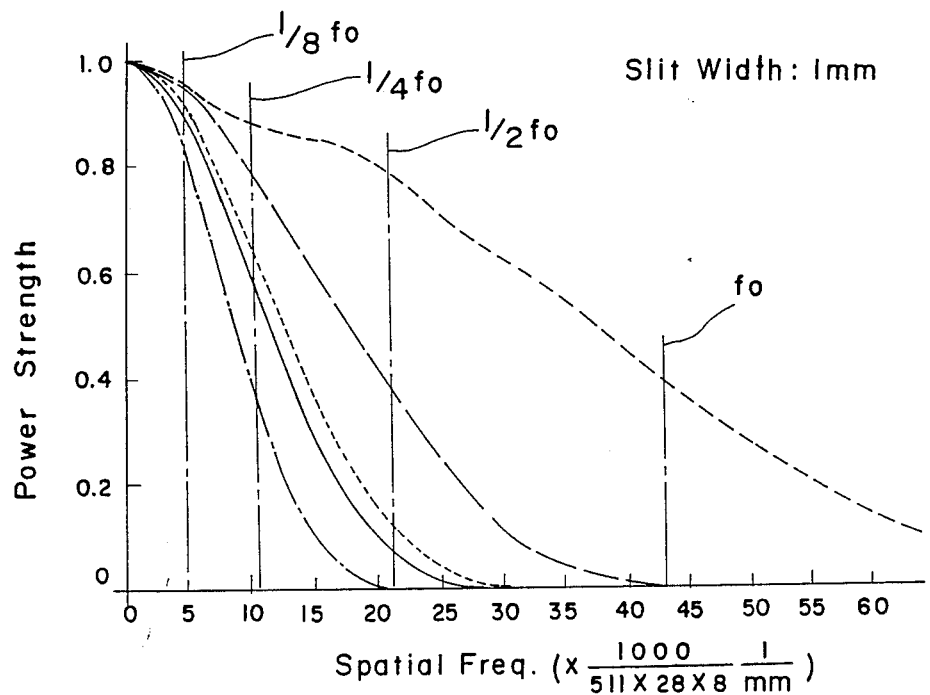
Figure 9:
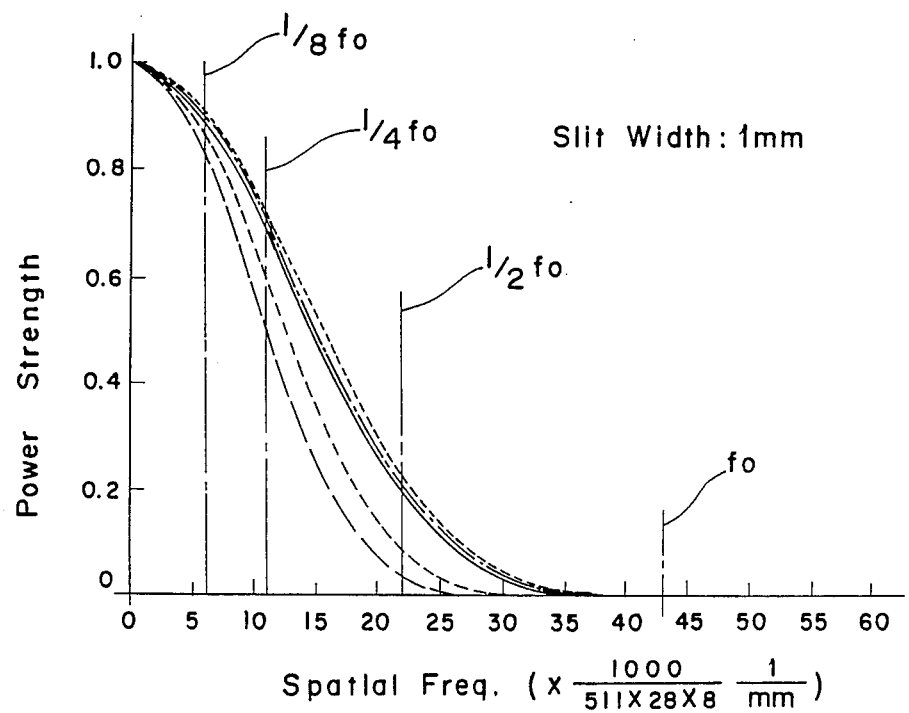

FIGS. 5 to 7 illustrate data obtained when the slit width of the single slit used for the image forming pattern was adjusted to 0.1, 0.2 and 0.4 m, respectively, with the image forming magnification being x1.8 and with the angle of 45° being employed for each of the angle of incidence to the surface of the sample and the light receiving angle. From these data shown in FIGS. 5 to 7, it will readily be seen that, assuming that the spatial frequency of a cycle twice the width of the slit image to be formed on the image forming plane is expressed by fo, the spatial frequency appropriate for the detection of the distinctness-of-image glossiness will be of a value within the range of $\frac{1}{4}$ to 3/2 time the spatial frequency fo for an ideal specular surface. In the data which are shown in FIGS. 8 and 9, respectively, and which were obtained using the slit width of 1 mm, the image forming magnification of x1.3 and 70° for each of the angle of incidence and the light receiving angle, it will also readily be seen that the spatial frequency appropriate for the detection of the distinctness-of-image glossiness is within the range of $\frac{1}{8}$ of 1 time the spatial frequency fo. It is to be noted that in each of FIGS. 5 to 9, the quantitative determination of the distinctness-of-image glossiness is possible even when a method other than that described, such as, for example, described with reference to FIG. 4, is employed. It is to be also noted that, in each of FIGS. 5 to 9, each curve represents the surface characteristic of the samples tested.

The method of the present invention wherein the distinctness-of-image glossiness is measured in terms of the power spectrum has many features, described subsequently, and is very useful for a practical purpose. That is to say, referring again to FIG. 3, if the position of the projected and formed image pattern falls within the measuring window of the image sensor 200, the power spectrum remains identical as a rule irrespective of the position thereof, and even if the intensity of light received varies, the power spectrum remains identical as a rule. Therefore, the measurement of the distinctness-of-image glossiness according to the present invention is performed substantially without being adversely affected by any change in the amount of reflected light due to the difference in reflectance of the sample surface and/or any possible displacement in position of the projected and, thus, formed image pattern due to the presence of a warp and/or a curve on the sample surface. This feature inherent in the method of the present invention is useful in constructing the distinctness-of-image glossmeter according to the present invention.

Although in the foregoing embodiment it has been described that the distribution of the light intensity of the single slit is transformed according to Fourier series to ultimately determine the power strength at the particular spatial frequency, it is also possible to determine the distinctness-of-image glossiness by transforming according to Fourier series the distribution of the light intensity relative to a plurality of slits, that is, a grid pattern having a combination of dark and light areas or a light and dark pattern to determine the power strength and obtaining recurrent data thereof.

Figure 14:
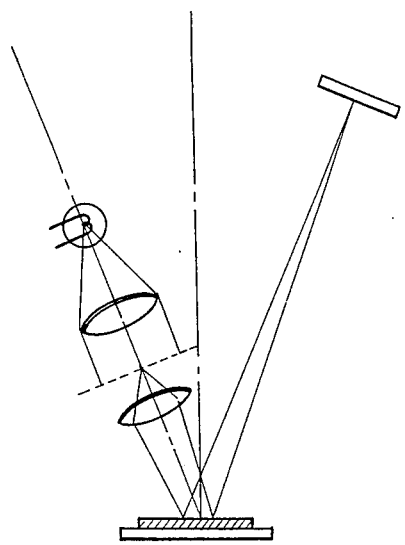
FIG. 14 is a diagram showing the embodiment of the present invention in which an imaging pattern is constituted by a striped pattern.
Figure 15:
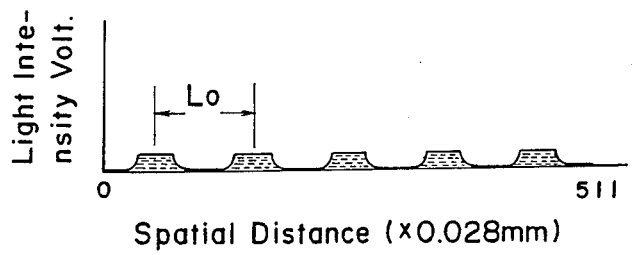
FIG. 15 is a graph showing the distribution of the light intensity on the image forming plane given when the striped pattern is employed.
Figure 16:
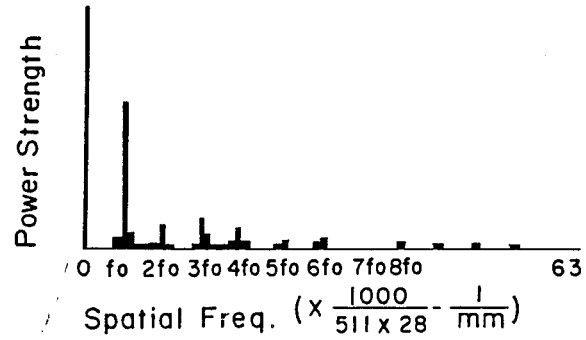
FIG. 16 is a graph showing the power spectrum of the spatial distribution of the light intensity shown in FIG. 15.

For example, one embodiment of the structure wherein the image forming pattern is employed in the form of a striped pattern is shown in FIG. 14. FIG. 15 illustrates the pattern of light received in the case where the striped pattern has 200 stripes per inch with each of the angle of incidence and the light receiving angle being 20° and the image forming magnification being at x20, whereas FIG. 16 illustrates the result of Fourier transformation of the pattern of the received light shown in FIG. 14. One or a combination of values of the power spectrum at a spatial frequency equal to or an integer multiple of the spatial frequency fo corresponding to the recurrent cycle Lo of the stripe pattern shown in FIG. 15 are employed to render the distinctness-of-image glossiness to be represented by numerical values based on the data shown in FIG. 16. In such case, the spatial frequency fo can be set to a value, at which the detectability is relatively high, by adjusting the value for the recurrent cycle Lo. In other words, it is preferred that the slit forming the pattern having a combination of dark and light areas be a recurrent slit, the spatial frequency of which is within the range of 0.5 to 20 mm$^{-1}$. In addition, where the difference between samples of high reflectance such as outermost layers of coating automobile bodies is desired to be detected, it has been found that adjustment of the slit width to a smaller value and/or adjustment of one or both of the angle of incidence and the light receiving angle to a smaller value are effective. However, in the case of the single slit, the smaller the slit width, the fainter the signal light, and therefore no highly accurate and precise detection can be performed. In such case, the use of the stripe pattern having the light and dark stripes is advantageous because the application of fine slit width is possible without accompanying any reduction in intensity of the signal light. Furthermore, as compared with the use of the single slit, an additional advantage can be appreciated in that the measured values varying because of different locations of measurement can be averaged.

A data processing system for detecting the spatial distribution of the light intensity of the projected and, hence, formed image pattern will now be described in details with reference to FIG. 10. An output signal from the image sensor 200, driven by a drive circuit 203, which signal is indicative of the spatial distribution of the light intensity photoelectrically detected by the sensor 200, is after having been amplified by an amplifier 202, to a peak hold circuit 204 on the one hand and, if desired, to a monitor device 201. On the other hand, a control unit 209 operates in response to a command fed thereto from a microcomputer through an interface unit 210, to sequentially control the peak hold circuit 204 and an analog-digital converter 205 in such a way that the peak value of the output signal indicative of the light intensity distribution, which is in the form of a pulse, is first held in the peak hold circuit 204 and is then converted into a digital signal. The digital signal emerging from the converter 205 is subsequently fed to a buffer memory 206. After the signal representative of the light intensity distribution has been written in the buffer memory 206 in the manner described above, the microcomputer reads out from the memory 206 the data of the light intensity distribution which are stored in the memory 206, and then performs calculation of the data, the result of such calculation being the outputed to one or both of the display unit 215 and the hard copy device 217. The sequence of operation of the microcomputer is controlled by a microprocessor 211, using a read-write memory 213 as a work area, according to a program stored in a read-only memory 212.

Figure 18:
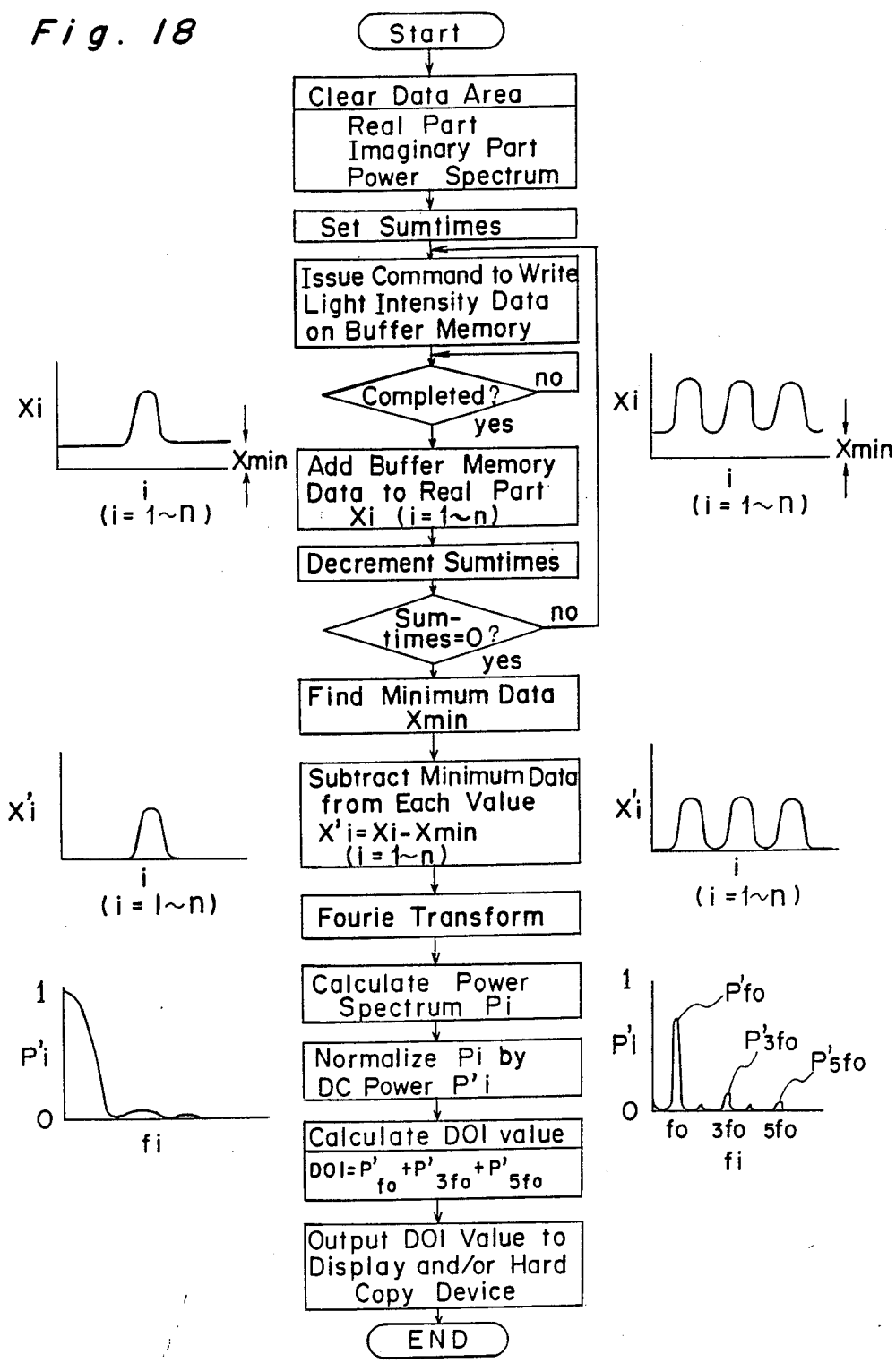
FIG. 18 is a flow chart showing a program necessary to calculate the distinctness-of-image glossiness from the distribution of the light intensity.

Hereinafter, a method for the determination of the distinctness-of-image glossiness from the data of the light intensity distribution will be described with reference to a program flow chart shown in FIG. 18. At the outset, after a necessary area of the read-write memory 213 used as the work area has been cleared, the number of summation of the light intensity distribution data is set. Subsequently, a command to write the light intensity distribution data in the buffer memory 206 is issued. To write the light intensity distribution data in the memory 206 is executed by the control unit 209 to which the command to do so is applied, and with no participation of the microprocessor 211. After the light intensity distribution data have been written in the memory 206, the control unit 209 generates an output indicative of the completion of the write-in of the data and the microprocessor 211, in response to such output from the interface 209, can add the data, stored in the buffer memory 206, to a data area of the read-write memory 213. By repeating the procedures a number of times equal to the number of summation set, noises contained in the signal indicative of the light intensity distribution can be averaged with respect to time and, therefore, reduced. Thereafter, in order to avoid any possible influence which would result from the index of reflection of the surface of the testpiece and/or external light, the minimum value of the light intensity distribution data set in the data area of the read-write memory 213 is determined and is then substracted from the light intensity distribution data to give the resultant data to which the Fourier transformation is subsequently carried out, followed by the calculation of the power spectrum.

In addition, in order to avoid any possible influence which the light intensity output from the light source and the index of reflection of the surface of the testpiece may bring on the power spectrum of the intensity of the light intensity distribution data, the power spectrum is normalized by the intensity of a direct current component. The sum of the power strengths at a particular spatial frequency of the normalized power spectrum is then determined and outputed to one or both of the display unit 215 and the hard copy device 217 as a parameter indicative of the distinctness-of-image glossiness.

It is to be noted that the method for determining the distinctness-of-image glossiness may not be limited to that described above, if desired, may be carried out by the use of the light power strength at the particular spatial frequency, the sum of the light power strengths at the plurality of the particular spatial frequencies, the integrated value of the light power strengths within the particular range of spatial frequency, or the spatial frequency at which the particular light power strength is attained. It is also possible to carry out the determination of the distinctness-of-image glossiness by performing the calculation without the minimum value being substracted from the light intensity distribution data, and/or without the power spectrum being normalized by the intensity of the D.C. component. Furthermore, the distinctness-of-image glossiness may be expressed in terms of a relative value determined in relation to that given by a black-colored glass.

Where the distinctness-of-image glossiness is calculated by the microcomputer, the calculation of the power spectrum over the entire range of spatial frequency is not always necessary and it may suffice to calculate only the power spectrum at a particular spatial frequency or within the particular range of spatial frequency depending on the range of distinctness-of-image glossiness to be measured.

In addition, the microcomputer serves not only to calculate the distinctness-of-image glossiness on the basis of the data on the spatial distribution of the light intensity detected by the image sensor 200, but also to calculate according to a program the magnification factor at which the image is projected and formed. Moreover, it may work to adjust the positions of the component parts forming the optical system according to the magnification displayed, and also to automate the position adjustment if so desired. Furthermore, the microcomputer can work according to a program to detect the point of focus and also to adjust, and if desired, to automate the adjustment of, the position of the sample holder 17 or the image forming optical system including the lens assembly 19 and the image sensor 200 according to information displayed of the focus point.

Figure 11:
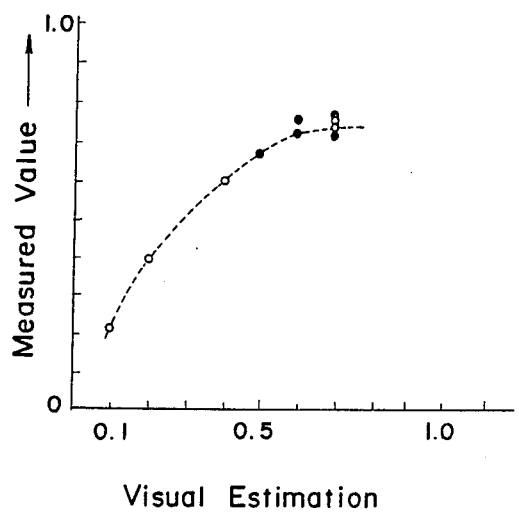
FIG. 11 is a graph showing the relationship between the measured value, obtained by the use of the apparatus of the present invention, and the visually estimated value of the distinctness-of-image glossiness.
Figure 17:
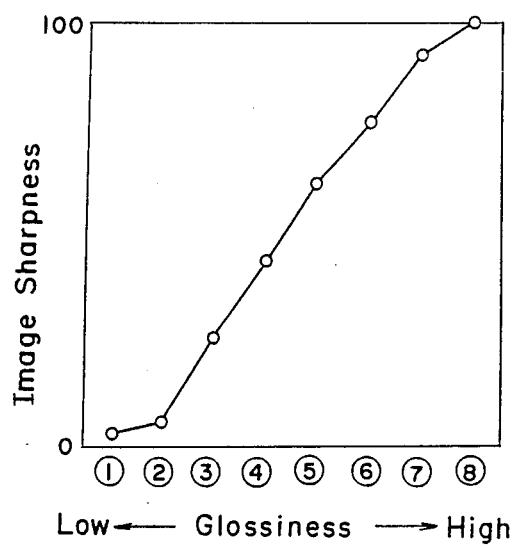
FIG. 17 is a graph showing the relationship between the measured values, obtained by the apparatus shown in FIG. 14, and the distinctness-of-image glossiness determined by the visual inspection.

FIG. 11 illustrates an example of the data corresponding to the visually estimated value of distinctness-of-image glossiness of the painted film surface and the measured values of the same obtained by presenting the numerical value according to the power strength at a particular spatial frequency with the apparatus of the present invention. In FIG. 11, the axis of abscissa represents the visually estimated value and the axis of ordinates represents the values measured by the use of the measuring apparatus of the present invention. From this graph, it will readily be seen that the both have a high correlationship with each other. FIG. 17 illustrates the date corresponding to the visually estimated values of the distinctness-of-image glossiness of the painted film surface and the measured values of the same obtained by presenting the numerical value according to the power strength at a particular spatial frequency by the use of the measuring apparatus of the present invention wherein the striped pattern having 200 stripes per inch was used for the projecting pattern. In FIG. 17, the axis of abscissa represents the order of the visually estimated values wherein 8 represents a sample of a surface mirror, 1 to 7 represent respective samples of coated layers on nails and 5 to 7 represent respective samples of outer-most layers coated on automobile bodies. It will readily be seen that the difference detectability has been improved in a range of high distinctness-of-image glossiness.

Figure 12:
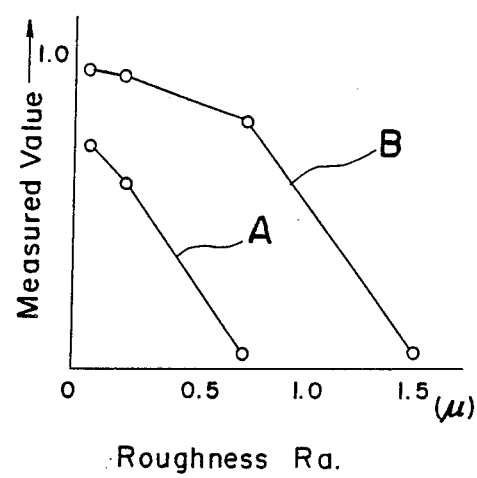
FIG. 12 is a graph showing the relationship between the measured value, obtained by the use of the apparatus of the present invention, and the arithmetical mean deviation of the profile detected by a roughness measuring instrument of a type having a stylus.

Hereinafter, the measurement of the surface roughness according to the present invention will be described. Since the gloss of the surface of an object appear to have a close relationship with the surface, a study has been made to find the relationship of the surface roughness with the measured values given by the distinctness-of-image glossmeter of the present invention. One example of measurements done to a certain painted film is shown in FIG. 12 wherein the axis of abscissa represents the average roughness measured by the use of a contact-type roughness measuring apparatus and the axis of ordinates represents the measured values given by the apparatus of the present invention. In FIG. 12, curves A and B have been resulted from the difference in slit width and, however, as can be readily understood from FIG. 12, the average roughness and the measured values have a certain relationship suggesting that the apparatus of the present invention can be used concurrently as a surface roughness measuring apparatus. Where the apparatus of the present invention is used for the measurement of the surface roughness, it can be advantageously employed to detect the surface roughness of a soft and pliable object with which the contact-type roughness measuring apparatus can not work very well. However, as suggested from FIG. 12, it is preferred or advisable to adjust the slit width to a proper value depending on the roughness of the surface to be tested. In other words, where the average surface roughness is large, the slit width should be adjusted to a large value such as shown by the curve B in FIG. 12 and, on the contrary, where it is small, it should be adjusted to a small value such as shown by the curve A in FIG. 12. As a result of a series of experiments and studies done in view of the above to find characteristics of the apparatus of the present invention, it has been found preferable, in carrying out the measurement of either of the distinctness-of-image glossiness and the surface roughness, to determine the range of the distinctness-of-image glossiness or the surface roughness to be examined, and then to design an optical system appropriate to such detecting range, i.e., to determine the slit width, the angle of incidence of the projected light, the light receiving angle and the image projecting and forming magnification. Specifically, provided that these parameters satisfy the respective requirements as set forth in Claims 3, 4 and 5 appended hereto, the partically satisfactory measurement can be performed according to the present invention.

Figure 13:
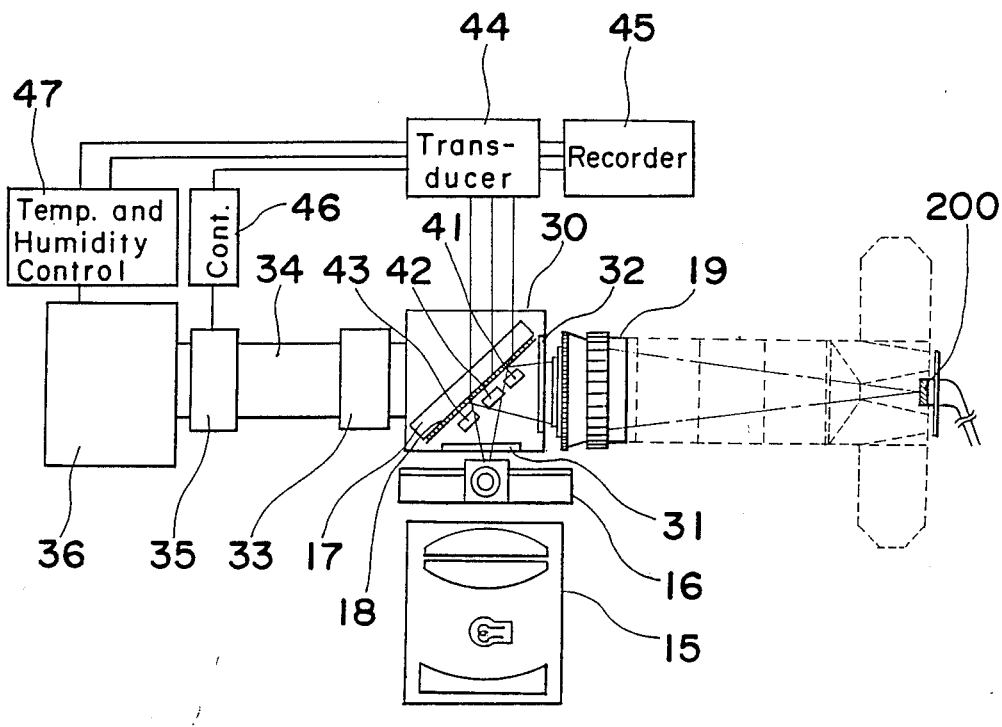
FIG. 13 is a diagram showing a still further embodiment of the present invention.

An apparatus developed to enhance the utility of the distinctness-of-image glossmeter of the present invention and the surface roughness measuring apparatus in view of the fact that the non-contact measurement, which is one of the features of the present invention, is possible is shown in FIG. 13 and will now be described in details with reference thereto. Referring now to FIG. 13, the apparatus comprises a chamber 30 capable of accommodating the sample holder 17 with the sample 18 thereon in a manner with both of the sample 18 and the sample holder 17 being capable of being separated from the exterior atmosphere. This chamber 30 has a pair of windows 31 and 32 made of optical glass and also a door (not shown) through which the sample 18 can be loaded into and removed from the chamber 30. The chamber 30 is coupled through a filter 33, a duct 34 and a blower 35 to a constant temperature and constant humidity unit 36, the connection between the duct 34 and the chamber 30 being, though not shown, so made as to permit a current of air within the chamber 30 to flow in a direction perpendicular to the surface of a paper without being substantially disturbed by the sample holder 17. The chamber 30 has disposed therein a pneumatic flow sensor 41, a temperature sensor 42 and a humidity sensor 43, outputs from the respective sensors 41, 42 and 43 being fed to a transducer 44 which are, after having been converted into respective electric signals of predetermined levels, in turn fed to a recorder 45 at which they are recorded and also to both of a control unit 46 for controlling the drive speed of the blower 35 and a temperature and humidity control unit 47. The control unit 47 serves to control all of a heater, a cooler and a humidifier (not shown) so as to keep the air within the constant temperature and constant humidity unit 36 at a predetermined temperature and a predetermined humidity. On the other hand, the control unit 46 serves to control the drive speed of the blower 35 to keep the flow of the air within the chamber 30 at a predetermined pneumatic velocity.

By so constructing, it is possible to cause the air of predetermined temperature and humidity to flow at the predetermined velocity within the chamber 30. By the use of this apparatus, it is possible to perform a non-contact measurement subject to the surface having its distinctness-of-image gloss and surface roughness susceptible to change in environmental condition, an example of which includes the continued measurement to trace time-based change of the distinctness-of-image glossiness or the surface roughness of a coated layer as it is dried. Thus, apparatus described with reference to and shown in FIG. 13 is particularly useful and effective in examining the behavior of the coated layer and the environmental conditions for a painting workshop which would affect the finish and surface contour of the painted layer.

As hereinbefore fully described, both the method of and the apparatus for measuring the surface characteristics such as the distinctness-of-image and the surface roughness are effective to quantitatively evaluate the extent to which the image of an object reflects on the surface to be tested as defined in JIS-Z-8741 which stipulates a general method for evaluating the glossiness with naked human eyes and also to perform the measurement in a condition substantially free from any influence which would result from the reflectance of the surface to be tested and/or from the presence of a warp and/or a curve on the surface to be tested. Also, they have such an additional advantage in that, by arithmetically processing the signal detected by the one-dimensional solid image sensor and indicative of the spatial distribution of the light intensity, the adjustment of the projecting and image forming magnification and the adjustment of the point of the focus can readily, but accurately be performed. Because of these numerous features and advantages, the precise reproducibility of the excellent measurement can advantageously be appreciated. Moreover, because of the adjustability of the slit width, the angle of incidence of the projected light, the light receiving angle and the projecting and image forming magnification, not only can a relatively wide range of measurement of the distinctness-of-image glossiness and the surface roughness be possible, but also the present invention can be practically embodied without using expensive optical elements, but with inexpensive ones.

Hereinafter, another preferred embodiment of the present invention will be described with reference to FIGS. 19 to 28.

Figure 19:
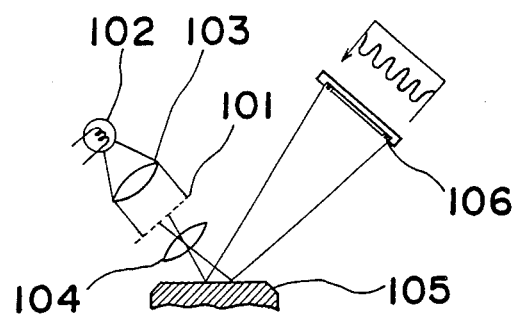
FIG. 19 is a diagram showing an optical system used in the practice of the method and the apparatus according to the present invention.

As shown in FIG. 19, a rectangular wave pattern 101 is illuminated from the rear by an illuminator optical means comprised of a light source 102 and a condensing lens 103 so that an image of the rectangular wave pattern 101 can be projected through an image forming lens 104, constituting an image forming optical means, onto a surface of a sample 105 to be tested and can then be reflected from the sample surface towards an image forming plane where a linear image sensor 106, which is a photoelectric transducer means. The linear sensor 106 is operable to measure the distribution of light intensities of the image so formed on the image forming plane.

Figure 20:
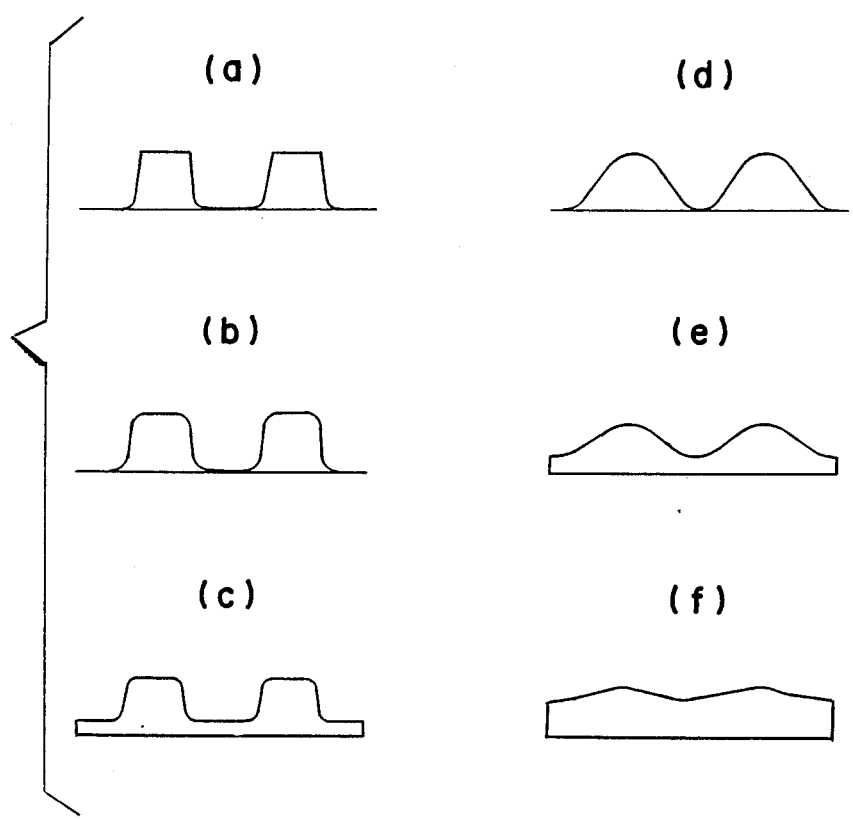
FIG. 20 is diagrams each showing the distribution of light intensity of the rectangular wave pattern whose image is formed through the reflection upon a surface of a particular paint coating.

In the image formation shown in FIG. 19, some examples of the formed image waveform detected by the image sensor 106 disposed on the image forming plane are shown in FIG. 20. FIG. 20(a) illustrates the case with the use of the black glass standard plate as the sample 105, and FIGS. 20(b) to 20(f) are the respective cases with the use of solid painting surfaces for the upper coat on an automobile. FIG. 20(a) shows that the formed image waveform has almost same shape as rectangular wave exhibiting a good contrast, but FIGS. 20(b) to 20(f) show that the formed image waveform is getting out of shape from the rectangular shape, exhibiting the lowering of the contrast although there is a difference in magnitude.

However, when carefully reviewing each of the formed image waveforms, various cases can be found in which, such as shown in FIG. 20(c), the rectangular shape of the waveform is relatively fairly retained (a white paint coating with no undulation (orange peel), but with somewhat cloudy appearance (blurring)) though the contrast is lowered; in which, such as shown in FIG. 20(d), the waveform gets out of the shape from the rectangular shape (a red paint coating with no cloudy appearance (blurring), but with undulation (orange peel)) though a relatively high contrast is retained; and in which the both of the above mentioned situations are contained such as shown in FIG. 20(e).

In the case of the formed image of such a simple stripe pattern, it can be considered that the distinctness-of-image glossiness of the painted coating can be expressed using the following two parameters.

Figure 21:
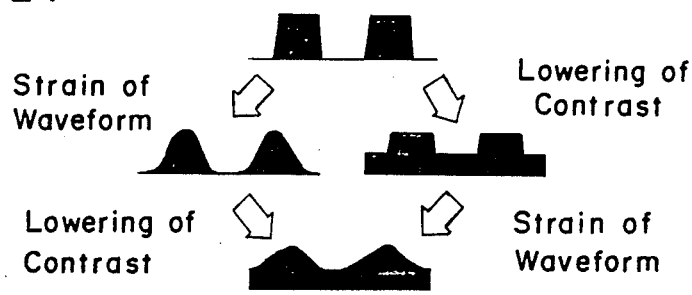
FIG. 21 is a diagram showing the lowering of the contrast and the deformation of the shape of the image of the rectangular wave pattern.

(a) Contrast
(b) Deformation of the waveform from the rectangular shape. (Degree of dissociation or approximation from the rectangular waveform).
 Boundary sharpness between bright and dark
 Fluctuation in period This is illustrated in FIG. 21. The contrast tends to be mainly affected by the scattering of light attributable to the surface roughness of the painted coating and also by the scattering of light attributable to such particles as pigments contained in the painted coating, and the deformation of the waveform tends to be mainly induced by change in incident light in opposite directions of reflection with each other resulting from the undulation (orange peel) present on the surface of the painted coating.

One embodiment of a method of and an apparatus for quantifying the contrast and the degree of deformation from the rectangular waveform on the basis of the image of the stripe pattern so obtained will now be discussed.

As hereinbefore discussed, the degree of cloudy appearance (blurring) of the image can be generally evaluated with the contrast.

The contrast of formed image corresponds to the difference between the intensity of light $R_P$ at the brightest area of an image of a sinusoidal wave grid pattern (a pattern in which dark and bright densities are alternating sinusoidally) and the intensity of light $R_B$ of the darkest area thereof. The contrast C can be calculated by the following equation.

$$C = \frac{(R_P - R_B)}{(R_P + R_B)} \times 100 \quad (I)$$

Figure 22:
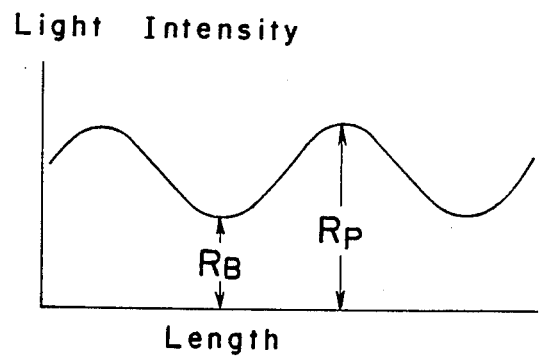
FIG. 22 is a chart showing a method of calculating the contrast of the image of the square wave pattern.

(See FIG. 22)

However, where a pattern whose density tends to change into a rectangular waveform is used, the contrast cannot be calculated with the equation (I). In the present embodiment, the contrast is calculated by calculating the power spectrum of the formed image waveform and determining the square root of the power at the fundamental spatial frequency, which will now be described.

Figure 23A:
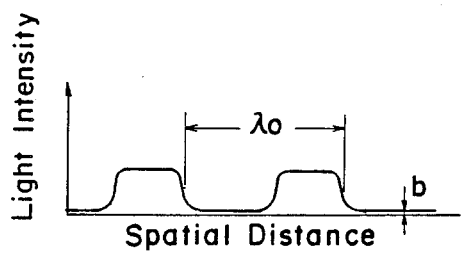
FIGS. 23(a) and (b) are graphs each showing the distribution of light intensity of the image of the rectangular wave pattern and its power spectrum.

In the image forming system shown in FIG. 19, while the spatial distribution of light intensities in the rectangular wave pattern 101 may be regarded as an ideal rectangular wave, the pattern projected onto and formed on the image forming plane after having been reflected from the surface of the sample 105 exhibits a shape deviating from the ideal rectangular wave as shown in FIG. 23(a) because of the diffusion and the scattering, that is, the blurring and distortion of the image, occurring depending on the surface condition of the sample. In FIG. 23(a), the axis of abscissas represents the spatial distance on the projected image at which the linear image sensor is disposed and the axis of ordinates represents the intensity of light.

Figure 23B:
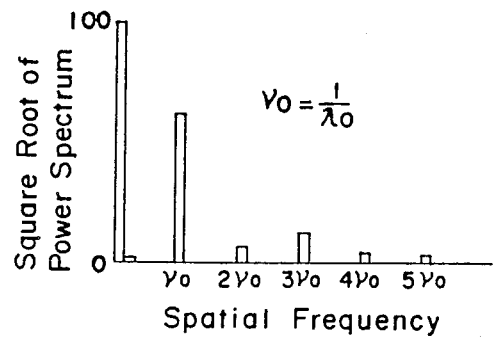

According to the theory of the Fourier expansion, it is well known that, as the boundary between dark and bright areas of the waveform pattern changes sharply, that is, as it is close to the shape of the rectangular wave, the intensity of the spatial high frequency component is high. In view of this, when the spatial light intensity distribution of the pattern of the image so formed as hereinabove described is transformed according to the Fourier expansion and then normalized by a direct current component intensity, a power spectrum such as shown in FIG. 23(b) can be obtained, which spectrum is comprised of a fundamental spatial frequency component $\nu_o$ and high frequency components $2\nu_o$.... In FIG. 23(b), the axis of abscissas represents the spatial frequency and the axis of ordinates represents the square root of power strength when the direct current component intensity is taken as 100.

If the waveform of the formed image deviates from the rectangular wave by reason of distortion and blurring of the sample surface to be tested as shown in FIG. 23(a), the overall power strength is reduced as shown in FIG. 23(b) and a spectrum is generated at a frequency other than an integer multiple of the fundamental spatial frequency $\nu_o$.

The degree of blurring of the surface of the sample 105 is represented by the power strength $P\nu_o$ at the fundamental spatial frequency $\nu_o$, or the square root $\sqrt{P\nu_o}$ thereof. This is by the following reason.

In contrast thereto, the power strength $P\nu_o$ at the fundamental spatial frequency $\nu_o$ represents a power of the sinusoidal wave of the fundamental spatial frequency $\nu_o$ contained in the formed image waveform. Accordingly, with this power strength $P\nu_o$ or the square root thereof, the contrast, that is, the degree of blurring of the sample surface can be determined. In order to determine the degree of blurring (NSIC*) with the power strength $P\nu_o$ or the square root thereof, it appears advisable or recommendable to express in terms of percentage relative to the power strength $P\nu_o$B.G. in, for example, a black glass plate which is used as a reference plate. This can be expressed by the following equation.

$$NSIC^* \frac{P^q\nu_o}{P^q\nu_oB.G.} \times 100 \quad (II)$$

wherein q represents a positive number such as ... ½, 1 ....

The distortion of the image on the sample surface can be considered as follows.

That is, if the image is distorted because of the presence of undulations on the sample surface, change at the boundary between the bright and dark areas of the waveform pattern becomes dull and the intensity of the spatial high frequency component is lowered according to the theory of the Fourier expansion. Accordingly, when the power spectrum obtained by transforming the spatial light intensity distribution of the formed image pattern is transformed according to the Fourier transformation and then normalizing with the intensity of the direct current component, the ratio between the power strength $P\nu_o$ of the fundamental spatial frequency component $\nu_o$ and the power strength $Pi\nu_o$ (wherein i is an integer greater than (I) of the high frequency components $2\nu_o$... varies in proportion to the sharpness of the pattern. However, since these power strengths are normalized by the direct current component, they take a relatively small value and, therefore, the S/N ratio gets worse.

In contrast thereto, if the base line intensity (indicated by b in FIG. 23(a)) is reduced from the formed image waveform, the direct current component will become small with the consequence that the power strength normalized with the direct current component increases relatively, minimizing the influence the noises may bring about.

Figure 24:
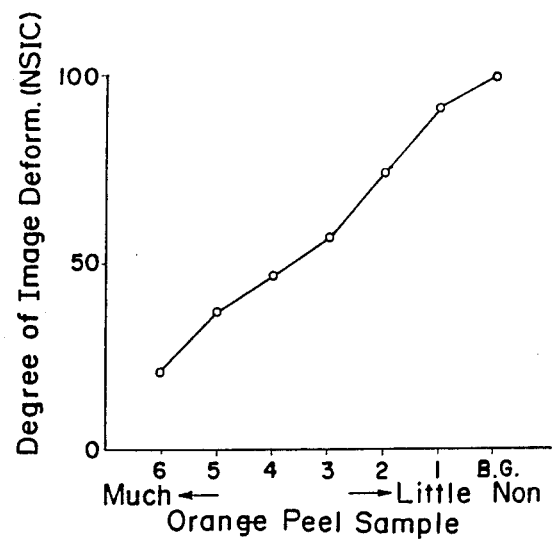
FIG. 24 is a graph showing the relationship between NSIC values and organoleptic test results of the orange peel.

In view of the foregoing, development of new standards for the evaluation of the degrees of distortion has been desired for. Accordingly, when a study has been made on the basis of the finding that, as the distortion of the shape of the formed image waveform becomes considerable with increase of the degree of orange peel, the contrast decreases accompanied by the reduction of the power strength $P\nu_o$ of the fundamental spatial frequency $\nu_o$, it has been found that the degree of distortion based on the following equation (III) coincides with that an organoleptic test as shown in FIG. 24. It is to be noted that the degree of distortion (NSIC) in FIG. 24 is expressed in terms of percentage relative to the total sum with the black glass plate which is used as a reference plate, as is the case with the previously mentioned degree of distortion. In FIGS. 24, numerals on the axis of abscissas represent the magnitude of the orange peel (distortion) according to the organoleptic test and B.G. represents the black glass plate (with no distortion) which is the reference plate.

$$NSIC = \frac{\sum_{i=1}^{n} jP_q k\nu_o}{\sum_{i=1}^{n} jP^q k\nu_o B.G.} \times 100 \quad \text{(III)}$$

wherein q represents a positive number such as ... ½, 1 ... as is the case with the equation (II), j is one of 1, i and (2i−1), and k represents i or (2i−1). In this equation (III), the denominator represents the total sum with the black glass plate which is the previously mentioned standard plate.

Figure 25:
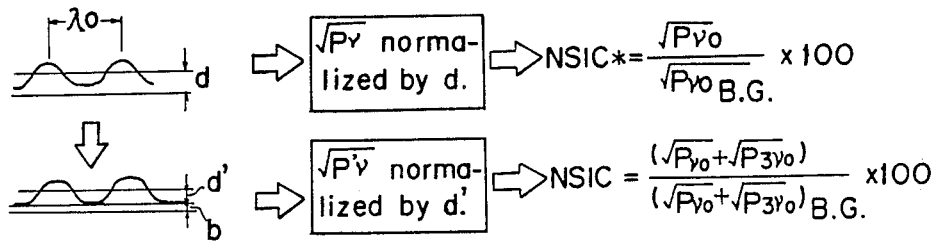
FIG. 25 is a diagram used to explain a method of calculating both NSIC* and NSIC values.

In this equation, when q=½, j=1, k=(2i−1), and i=1, 2, such equations for NSIC and NSIC* as shown in FIG. 25 can be obtained. The NSIC* value is expressed in terms of percentage of the square root of the power of the fundamental spatial frequency of the power spectrum of the formed image waveform, as shown in the left-hand portion of FIG. 25, which has been normalized by the direct current component intensity shown by d (i.e., $\sqrt{P\nu_o}$) relative to that with the black glass plate which is the reference plate (i.e., $\sqrt{P\nu_o}B.G.$). Also, the NSIC value is expressed in terms of percentage of the sum of the square root of the power of the fundamental spatial frequency of the power spectrum of the formed image waveform from which the base line intensity b has been substracted, and the square root of the power of the frequency which is three times the above described fundamental spatial frequency, both of said powers being normalized by the direct component intensity shown by d', relative to that with the black glass plate. As shown therein, the reason that the degree of distortion (NSIC) can be represented by the total sum of the power strength at the fundamental spatial frequency $\nu_o$ and the power strength at the frequency is because, as can be understood from FIG. 23(b), the power strengths of the spatial frequencies $(3\nu_o, 5\nu_o \ldots)$ which are odd-number multiplications of the fundamental spatial frequency $\nu_o$ is greater than the power strengths of the spatial frequencies $(2\nu_o, 4\nu \ldots)$ which are even-number multiplications of the fundamental spatial frequency.

As hereinbefore described, according to the method of the present invention, not only can the blurring and the distortion of the sample surface be measured as separate parameters, but also results of measurement which coincide with those based on the organoleptic test can be obtained even when the orange peel and the blurring are considerable.

An apparatus used to execute the above described method according to the second preferred embodiment of the present invention will now be described.

Figure 10:
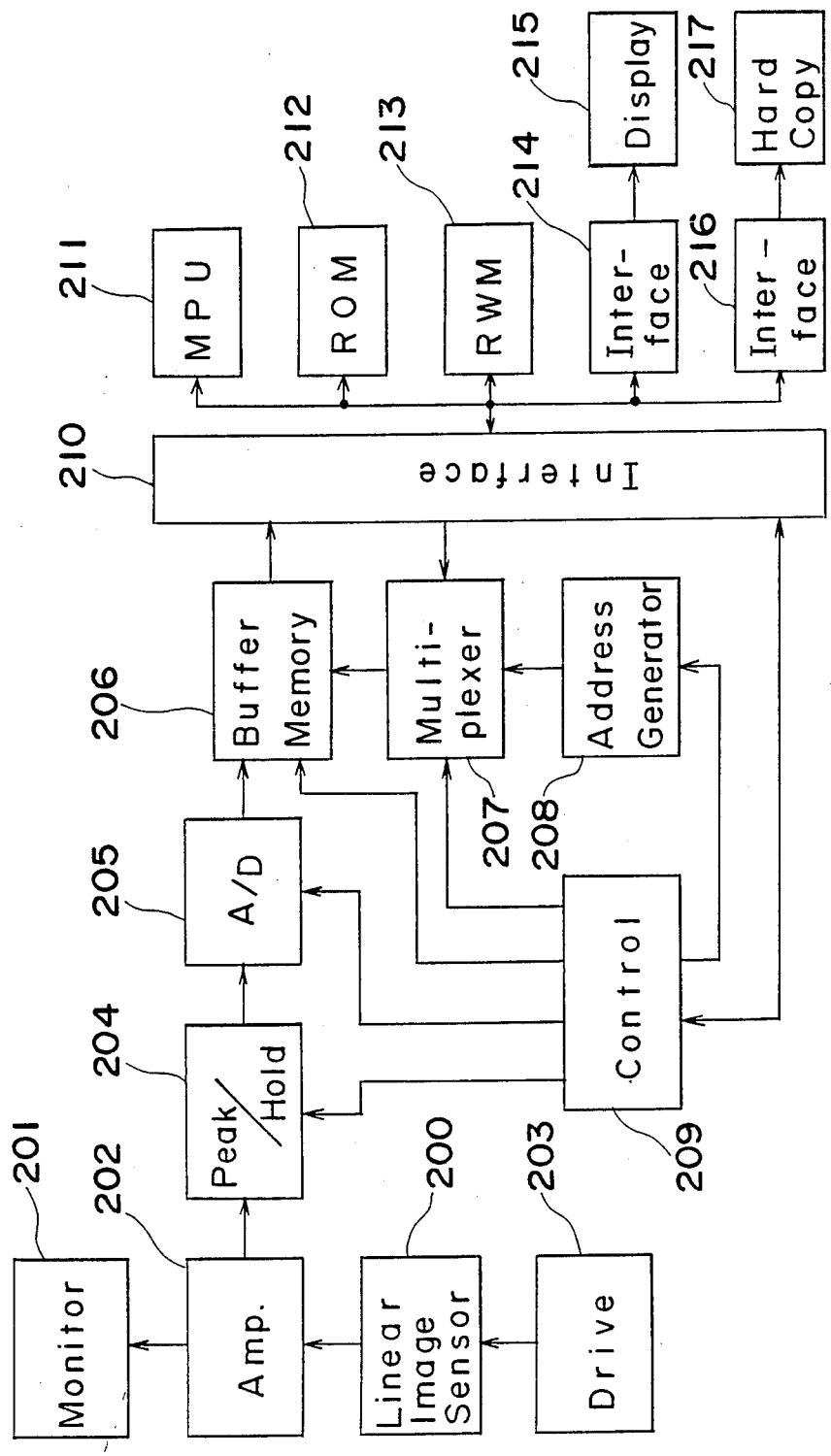
FIG. 10 is a block circuit diagram showing a data processing device according to one preferred embodiment of the present invention.
Figure 26:
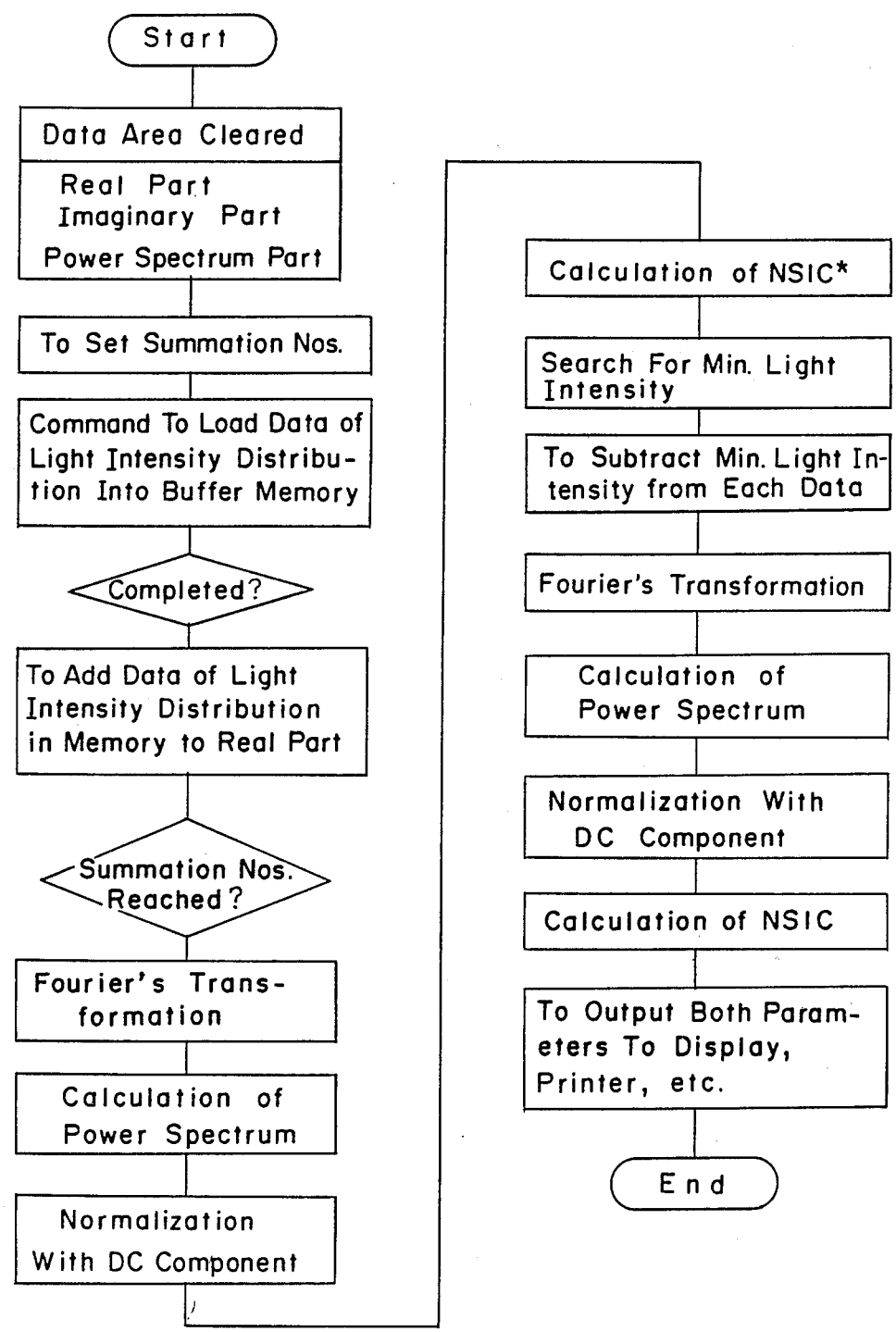
FIG. 26 is a flowchart showing the method of calculating the NSIC* and NSIC values.

The apparatus has its interior construction as shown in FIG. 10. The microcomputer forming the data processing means executes such a program flow as shown in FIG. 26 when carrying out the method according to the second preferred embodiment of the present invention. The program represented by the flow chart shown in FIG. 26 is stored in the program storage read-only memory (ROM).

Referring now to FIG. 26, simultaneously with the start, each data area of the RWM (data storage read-write memory) forming the real part, the imaginary part and the power spectrum part is cleared. After the number of summation to be performed has subsequently been set, data (light intensity distribution signal) emerging from the linear image sensor 106 are loaded in the buffer memory. Upon the completion of the data loading, the data are then added a predetermined number of times to the real part of the data area from the buffer memory. After the addition has been performed the predetermined number of times, the data are transformed into the power spectrum according to the Fourier transformation. The power spectrum so obtained is then normalized by the direct current component, and the degree of blurring (NSIC*) of the image is calculated in reference to the power strength of the fundamental spatial frequency component of the power spectrum.

Thereafter, out of the data descriptive of the aforesaid light intensity distribution signal, the minimum value of the light intensity min, that is, the base line intensity b, is searched for and is then subtracted from the data. The waveform data from which the base line intensity has been subtracted is transformed according to the Fourier transformation to give the power spectrum. After the power spectrum so obtained has been normalized by the direct current component, an addition is performed to sum the power strength of the fundamental spatial frequency component and the power strength of the spatial frequency component together, thereby to give the degree of distortion (NSIC) of the image.

The degree of blurring (NSIC*) and the degree of distortion (NSIC) so calculated in the manner as hereinabove described are displayed by a display which is a display device, and/or printed out by a printer as a hard copy, thereby completing a cycle of operation.

Figure 27A:
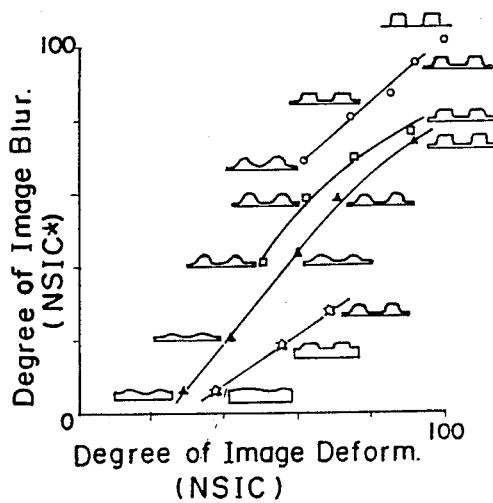
FIGS. 27(a) and (b) are diagrams each showing, in two-dimensional representation, the distinctness-of-image glossiness of numerous paint coatings based on the NSIC* and NSIC values.
Figure 27B:
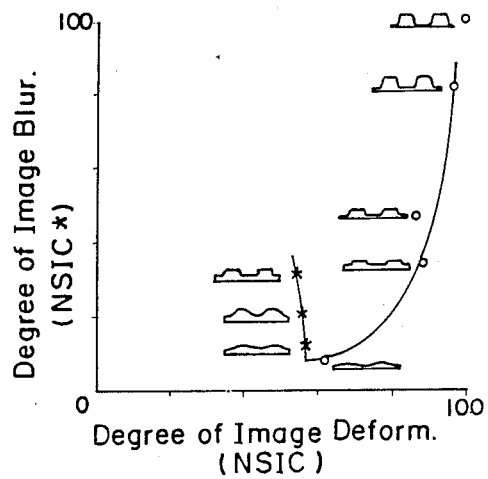

With the use of the above described method and the above described apparatus, samples of painted coatings were tested as to the surface characteristic. Results of the tests are shown in FIGS. 27(a) and 27(b). In each of FIGS. 27(a) and 27(b), any one of the degree of blurring (NSIC*) of the image and the degree of distortion (NSIC) of the image is expressed in terms of percentage relative to that exhibited by the black glass plate which is the reference plate, and the following markings denote the following samples.

| | |
|---|---|
| - - - | Solid deep red (Samples with various orange peel) |
| -□-□- | Solid white (Samples with various orange peel) |
| -△-△- | Solid red (Samples with various orange peel) |
| - - - | Metallic silver (Samples with various orange peel) |
| - - - | Metallic silver (Samples with various blurring and without orange peel) |
| - - - | Solid red (Samples with various blurring and without orange peel) |

Each of the waveforms depicted along each of the curves in FIGS. 27(a) and 27(b) represents the distribution of light intensity of the image waveform formed on the linear image sensor which is descriptive of the surface profile of the associated sample. Deviation in shape from the rectangular wave means an increase of distortion of the image, and increase of the base line from zero means an increase of the degree of blurring of the image.

Figure 28:
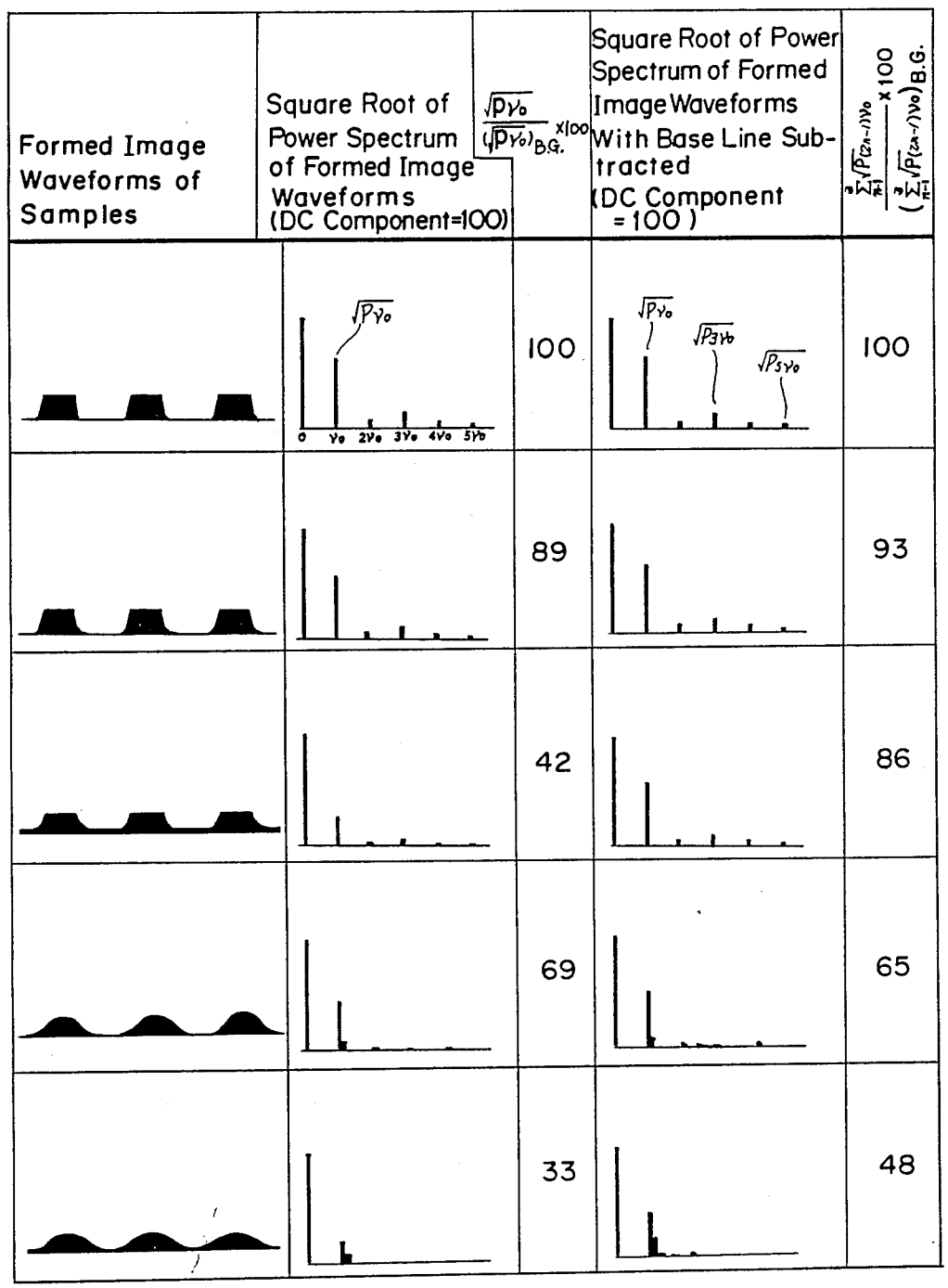
FIG. 28 is a table showing the relationships among the light intensity distributions, the power spectra, the NSIC* values and the NSIC values of the images of the rectangular wave pattern resulting from the associated paint coatings, respectively.

FIG. 28 illustrates (i) formed image waveforms of the respective samples, (ii) the square root of the power spectrum of each formed image waveform when the direct current component is taken as 100 and the value of $\{\sqrt{P\nu_o}/(\sqrt{P\nu_o})_{BG}\}\times 100$ as the NSIC* value, and (iii) the square root of the power spectrum of each formed image waveform from which the base line has been substracted, when the direct current component is taken as 100, and the value of the formula, $$\sum_{n=1}^{3}\sqrt{P_{(2n-1)\nu_o}} / \left\{\left(\sum_{n=1}^{3}\sqrt{P_{(2n-1)\nu_o}}\right)_{BG}\right\} \times 100$$

is taken as the NSIC value. Specifically, FIG. 28(a) illustrates the results of measurement with the black glass plate BG which is used as the reference, showing the presence of a contrast and the absence of any distortion. FIG. 28(b) illustrates the result of measurement with the solid red with no orange peel. FIG. 28(c) illustrates the results of measurement with the solid white with no orange peel. FIG. 28(d) illustrates the results of measurement with the solid red with orange peel. FIG. 28(e) illustrates the result of measurement with the solid white with orange peel.

In order to grasp the correlation between the light intensity distribution of the above described formed image waveform and both of the degrees of blurring and distortion, measurement of both of the NSIC* value and the NSIC value of such samples as having exhibited the respective formed image waveforms as shown in FIGS. 20(a) to 20(f) was carried out, and the samples were then evaluated by naked eyes. Results thereof are tabulated in Table I below.

TABLE 1

| Waveforms (Samples) | Image Blurring | | Image Distortion | |
|---|---|---|---|---|
| | With Naked Eyes | NSIC* Value | With Naked Eyes | NSIC Value |
| FIG. 20(a) (Black glass plate) | no | 100 | no | 100 |
| FIG. 20(b) (Solid red) | no | 89 | no | 93 |
| FIG. 20(c) (Solid white) | Bad | 42 | no | 86 |
| FIG. 20(d) (Solid red) | Average | 69 | Average with orange peel | 65 |
| FIG. 20(e) (Solid white) | Bad | 33 | Bad with orange peel | 48 |
| FIG. 20(f) (Solid red) | Extremely bad | 16 | Extremely bad | 14 |

From the figures and the table above, it has been found that the surface characteristics of the respective samples have well matched with both of the degree of distortion (NSIC) of the surface and the degree of blurring (NSIC*) of the surface.

Since the method and the apparatus according to the hereinbefore described, the degree of blurring and to degree of distortion of the image can be individually quantified and, even in the case where the orange peel and the degree of blurring are considerable, they can well match with the results of organoleptic tests.

Hereinafter, as a third preferred embodiment of the present invention, a method aimed at providing a method of an apparatus for individually quantifying the degree of deformation of the image attributable to the undulation of the sample surface to be tested and the degree of blurring of the image attributable to the roughness of the sample surface, both of which degrees are primary factors that affect the distinctness-of-image glossiness of the paint coating, will be described. The third preferred embodiment is a method of quantifying the distinctness-of-image glossiness of the sample surface by projecting an image of a rectangular wave pattern, which has been reflected from a surface to be tested, onto an image forming plane by means of an image forming optical system to form the image of the pattern on the image forming plane, and transforming the spatial distribution of the intensity of light falling on the image plane according to the Fourier transformation to enable the quantification of the distinctness-of-image glossiness in terms of the magnitude of the light power strength at a particular spatial frequency, which method is characterized in that the blurring of the image is quantified by the power strength at a fundamental spatial frequency and the degree of deformation of the image is quantified by a ratio of the sum of the power strengths at a plurality of frequencies which are an integer multiple of the fundamental spatial frequency relative to the power strength at the fundamental spatial frequency.

The third preferred embodiment is also a method of quantifying the distinctness-of-image glossiness of the sample surface by projecting an image of a rectangular wave pattern, which has been reflected from a surface to be tested, onto an image forming plane by means of an image forming optical system to form the image of the pattern on the image forming plane, and transforming the spatial distribution of the intensity of light falling on the image plane according to the Fourier transformation to enable the quantification of the distinctness-of-image glossiness in terms of the magnitude of the light power strength at a particular spatial frequency, which method is characterized in that the degree of blurring of the image is quantified by the power strength at a fundamental spatial frequency and the degree of deformation of the image is quantified by a ratio of the sum of the power strengths at a plurality of frequencies in the vicinity of the fundamental spatial frequency relative to the power strength at the fundamental spatial frequency.

An apparatus for carrying any one of the above mentioned method is characterized in that it comprises an illuminating optical means for illuminating a rectangular wave pattern, an image forming optical system for projecting an image of the rectangular wave pattern, reflected from a surface to be tested, onto an image forming plane to form the image of the rectangular wave pattern on an image forming plane, a photoelectric converting means for converting a spatial distribution of the intensity of light of the formed image waveform on the image forming plane into an electric signal, and a data processing means for transforming a spatial light intensity distribution signal from the photoelectric converting means according to the Fourier transformation thereby to calculate the intensity of a power spectrum at a particular spatial frequency so that the surface characteristic can be measured from the power spectrum calculated by the data processing means, which apparatus is characterized in that there is provided a calculating means for calculating the power spectrum at a fundamental spatial frequency and also the sum of the power strengths at a plurality of frequencies which are an integer multiple of the fundamental spatial frequency relative to the power strength at the fundamental spatial frequency.

Also, the present embodiment is an apparatus characterized in that it comprises an illuminating optical means for illuminating a rectangular wave pattern, an image forming optical system for projecting an image of the rectangular wave pattern, reflected from a surface to be tested, onto an image forming plane to form the image of the rectangular wave pattern on an image forming plane, a photoelectric converting means for converting a spatial distribution of the intensity of light of the formed image waveform on the image forming plane into an electric signal, and a data processing means for transforming a spatial light intensity distribution signal from the photoelectric converting means according to the Fourier transformation thereby to calculate the intensity of a power spectrum at a particular spatial frequency so that the surface characteristic can be measured from the power spectrum calculated by the data processing means, which apparatus is characterized in that there is provided a calculating means for calculating the power strength at a fundamental spatial frequency and the ratio of the sum of the power strengths at a plurality of frequencies in the vicinity of the fundamental spatial frequency relative to the power strength at the fundamental spatial frequency.

Hereinafter, the present embodiment will be described in detail with particular reference to FIGS. 29 to 34.

Figure 29A:
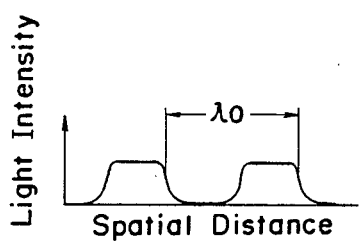
FIGS. 29(a), 29(b), 30(a), 30(b), 31(a) and 31(b) are graphs showing the light intensity distributions of the image of the rectangular wave pattern and their power spectra both resulting from the associated paint coatings.
Figure 29B:
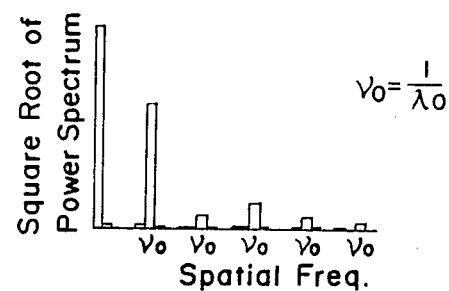
Figure 30A:
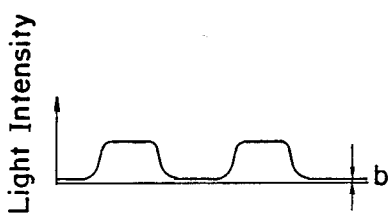
Figure 30B:
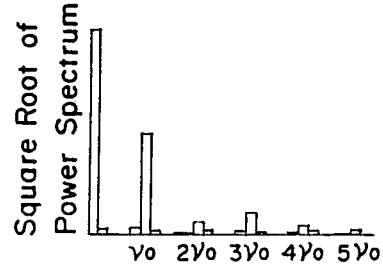
Figure 31A:
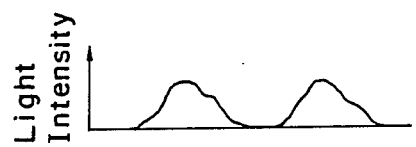
Figure 31B:
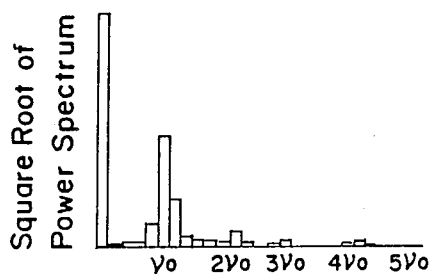

FIGS. 29(a) and 29(b), FIGS. 30(a) and 30(b) and FIGS. 31(a) and 31(b) illustrate respective distributions of light intensities, measured with the use of the optical system of FIG. 19, of various samples projected onto the image forming plane, and their associated power spectra. FIGS. 29(a) and 29(b) are associated with the painted surface with no undulation and with minimized surface roughness, in which case neither deformation nor blurring of the image can be observed. FIGS. 30(a) and 30(b) are associated with the painted surface in which, although it has no undulation with no deformation of the image, the image blurring (cloudiness) attributable to the roughness of the surface can be observed. FIGS. 31(a) and 31(b) are associated with the painted surface in which, although the deformation of the image attributable to the undulation of the surface can be observed, no image blurring can be observed. From these figures, it can be regarded that the blurring effect of the image affects the intensity of light (shown by b in FIG. 30(a)) at a dark area of the light intensity distribution of the formed image and, as a result, in the power spectrum, it can be represented by reduction in spectrum value normalized with the direct current component, which effect results not only in the reduction of the spectrum value at the fundamental frequency and also at the spatial frequency which is an integer multiple of the fundamental frequency, accompanied by a large deformation of the light intensity distribution at the image forming plane from the rectangular waveform, but also in the generation of a power component at frequencies other than the fundamental frequency and also at the spatial frequencies which are an integer multiple of the fundamental frequency at which it should not have been observed.

The method and the apparatus according to the present embodiment have been developed with the above having been taken into consideration and is such that the degree of blurring of the image is quantified by the power strength at the fundamental spatial frequency and the degree of deformation of the image is quantified by the ratio of the sum of the power strengths at a plurality of frequencies which are an integer multiple of the fundamental spatial frequency relative to the power strength at the fundamental spatial frequency.

The apparatus for carrying out the method according to the present invention will now be described.

Figure 34:
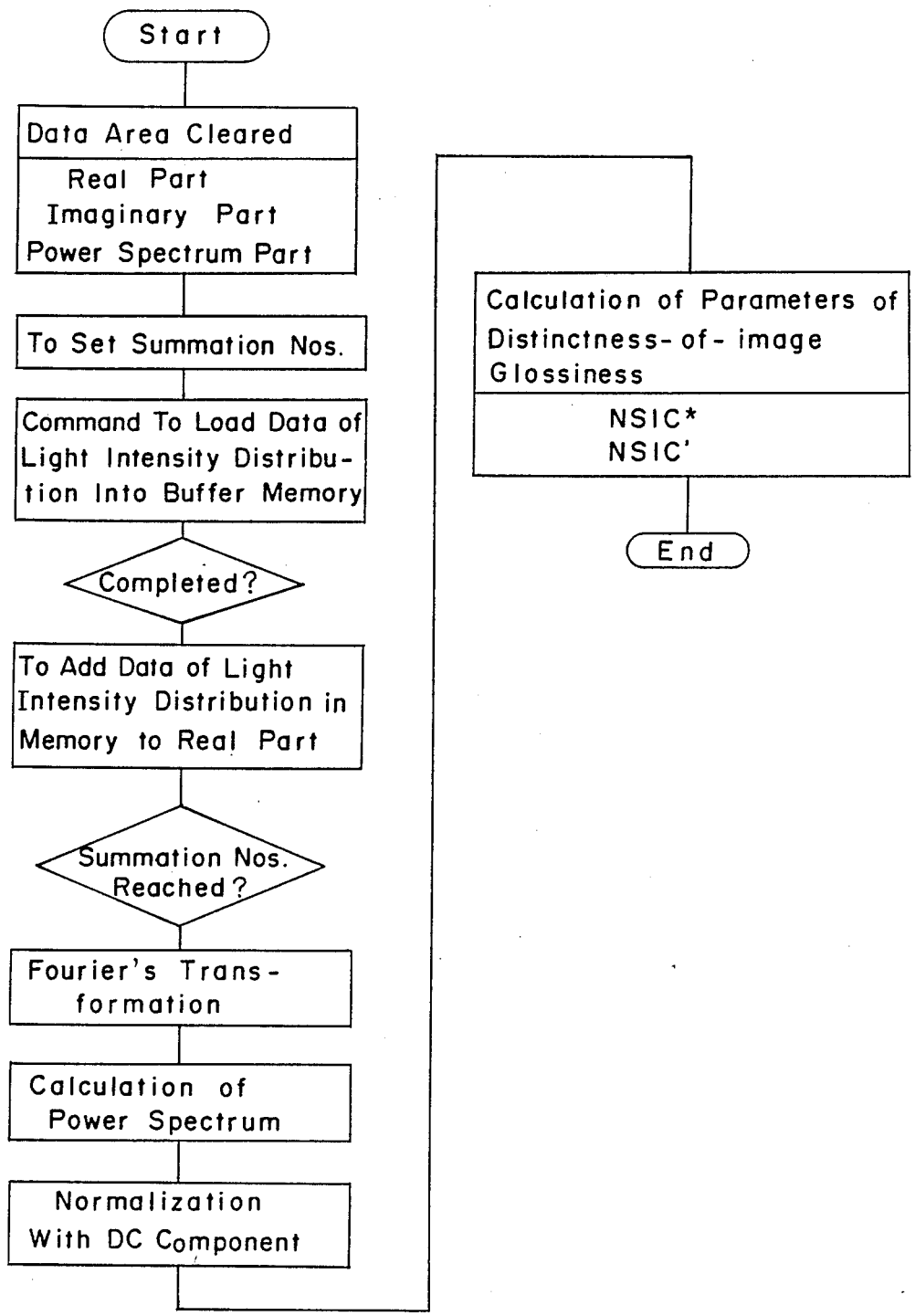
FIG. 34 is a flowchart showing the method of calculating the NSIC* and NSIC' values.

Of the various components necessitated to execute the method of the present invention, an optical system comprising the illuminating optical means and the image forming optical means is substantially identical with that shown in FIG. 19. A program for executing the method shown in the flowchart of FIG. 34 is loaded in a program storage read-only memory 212 shown in a block circuit diagram of the data processing device as shown in FIG. 10.

Figure 33:
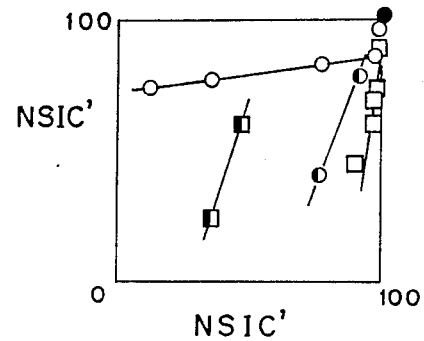
FIG. 33 is a diagram showing, in two-dimensional representation, the distinctness-of-image glossinesses of numerous paint coatings based on the NSIC* and NSIC' values.

With this, a parameter, NSIC*, which represents the degree of blurring of the image expressed by the equation (II), such as shown in FIG. 33, can be calculated.

$$NSIC^* = \frac{P^q v_o}{P^q v_o B.G.} \times 100 \quad (II)$$

wherein q represents a positive number such as ... $\frac{1}{2}$, 1 ...

In equation (II), the power strength $Pv_o$ at the fundamental spatial frequency $v_o$ represents a power of the sinusoidal wave of the fundamental spatial frequency $v_o$ contained in the formed image waveform. Accordingly, with this power strength $Pv_o$ or the square root thereof, the contrast, that is, the degree of blurring of the sample surface can be determined. In order to determine the degree of blurring (NSIC*) with the power strength $Pv_o$ or the square root thereof, it appears advisable or recommendable to express in terms of percentage relative to the power strength $Pv_o$B.G. in, for example, a black glass plate which is used as a reference plate.

Furthermore, as a parameter representative of the deformation of the image, NSIC' expressed by the following equation can be calculated.

$$NSIC' = 100 \times \left( \frac{\sum_{i=1}^{n} jP^q k v_o}{P^q v_o} \right) \Bigg/ \left( \frac{\sum_{i=1}^{n} jP^q k v_o B.G.}{P^q v_o} \right)_{B.G.} \quad (IV)$$

wherein q represents a positive number such as ... $\frac{1}{2}$, 1 ... as is the case with the equation (II), j is one of 1, i and (2i−1), and k represents i, i+1 or (2i−1). In this equation (IV), the denominator represents the value with the black glass plate which is the previously mentioned standard plate.

In this way, both of the parameter NSIC* indicative of the degree of blurring and the parameter NSIC' indicative of the strain of the image can be separately quantified so individually as to minimize any possible deviation.

Figure 32:
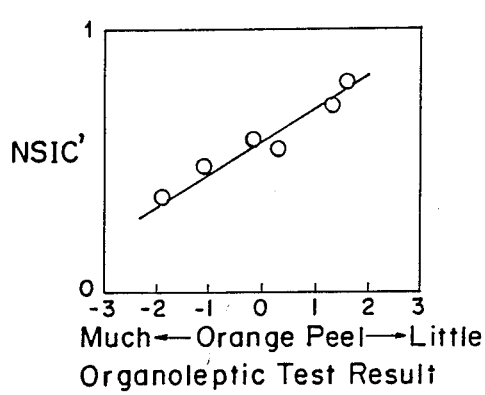
FIG. 32 is a graph showing the relationship between the organoleptic test result and the NSIC' value of the orange peel.

In the equation (IV), while one example of the relationship between the parameter NSIC' indicative of the degree of deformation of the image and the results of organoleptic evaluation, both taken when q=$\frac{1}{2}$, j=1, and k=2, ... 7, illustrated in FIG. 32, it can be observed that the measures (the axis of ordinates) representing the deformation of the image so determined in this way coincide with the organoleptically evaluated value. In FIG. 33, results of measurement conducted on the various samples are illustrated. The axis of abscissas represents the measures (NSIC') representative of the deformation of the same image, and the axis of ordinates represents NSIC* calculated by the equation (II) as measures representative of the blurring of the image. In FIG. 33, the marking represents a surface mirror; the marking O represents a group of painted samples having different surface undulations though the surface roughness is very small; the marking represents a group of painted samples having different surface roughness though the surfaces thereof have no undulation; and the markings and represent a group of samples having different surface roughnesses and different surface undulations, both of the blurring of the image attributable to the roughness of the surface and the degree of deformation of the image attributable to the surface undulation being clearly illustrated. Calculating procedures employable in this case are illustrated by way of a flow-chart in FIG. 34. Both of FIGS. 32 and 33 illustrate results obtained when the spatial frequency of the rectangular wave at the surface of the sample to be tested is 0.56 mm$^{-1}$, the image forming magnification is 28.2, the angle of projection of the light was 20°, and the position at which the sample surface is installed is such that the distance between the principal point of an image forming lens and the sample surface is 0.44 of the distance between the principal point of the image forming lens and the image forming plane.

As the measures for the image deformation, it has been found that a similar effect can be obtained even when a ratio between the power strength at the fundamental frequency and the sum of the power strengths at plural spatial frequencies in the vicinity of the fundamental frequency is used.

Figure 35:
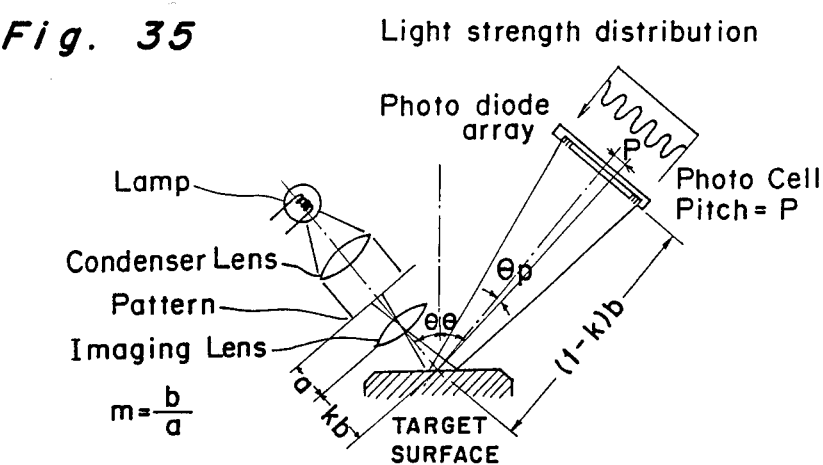
FIG. 35 is a diagram showing limited conditions for the optical system used in the practice of the method and the apparatus according to the present invention.

A fourth embodiment of the present invention is a method characterized in that, in the optical system shown in FIG. 35, the spatial distribution of the intensity of the light of the formed image is expressed by the following equation in terms of the angular resolving power;

$$0.03° \geq \tan^{-1} P/(1-k)b \quad (V)$$

preferably;

$$0.003° \geq \tan^{-1} P/(1-k)b \quad (VI)$$

wherein P represents the spatial distance interval measurable by the detecting means and $(1-k)b$ represents the distance between the surface to be tested and the detecting means.

It is however to be noted that $\theta p$ in FIG. 35 is expressed by the following equation.

$$\tan\theta p = P/(1-k)b \quad (VIII)$$

Figure 36:
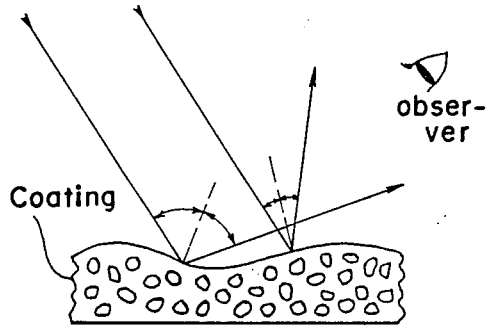
FIG. 36 is a diagram used to explain the manner in which positive and negative directions of reflection of light vary with the undulation present on the surface of a paint coating.

The reason for the necessity of the above described limitation in the present invention will be described. The light incident upon the coated surface varies, as shown in FIG. 36, in its positive and negative directions of reflection depending on the inclination of the coated surface. This change in direction of reflection may consitute a cause of the strain of the image projected onto the painted coating surface, however, the degree of variation of the direction of specular reflection according to the inclination of the coated surface was measured with the use of a measuring system shown in FIG. 37.

Figure 37:
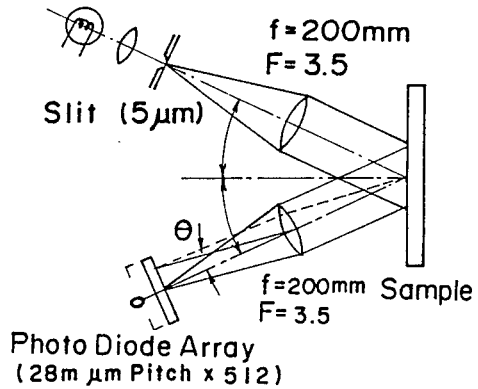
FIG. 37 is a diagram showing the structure of an apparatus for optically evaluating the undulation of the surface of the paint coating.

An equipment used for this measurement is shown in FIG. 37 and samples used include car finishes which are coated under varying spray conditions so as to have varying orange peels. The paint used are white melamine-alkyd resin paint and red melamine-alkyd resin paint.

Figure 38:
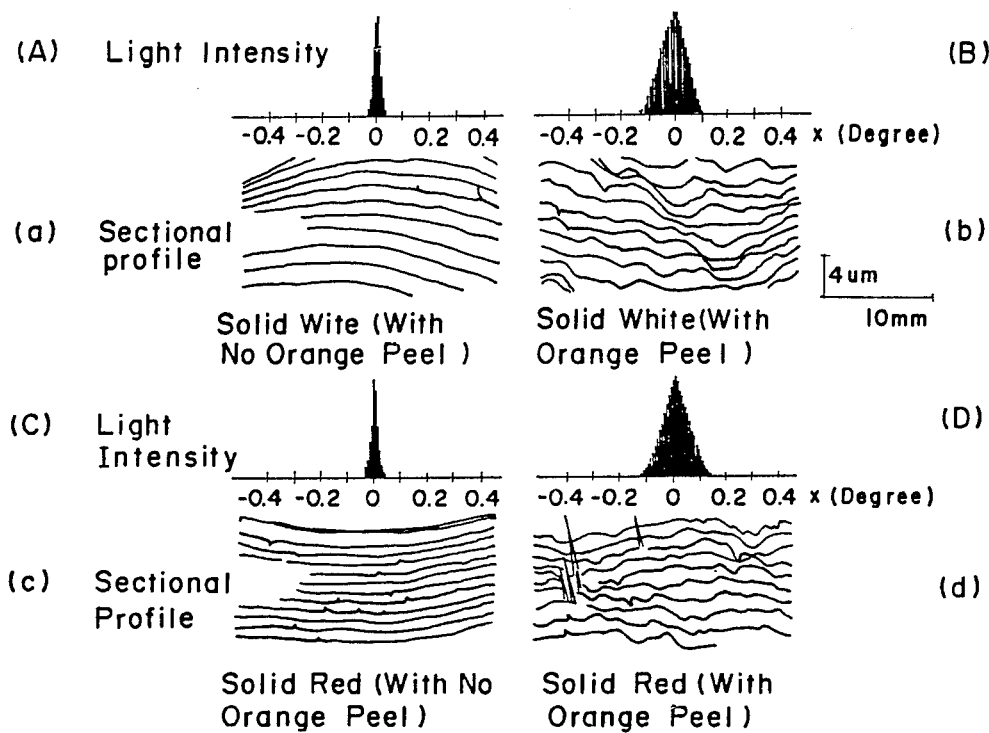
FIG. 38 is diagrams each showing the range in which the positive and negative directions of reflection of light resulting from the undulation of the paint coating surface, as measured with the use of the apparatus of FIG. 37, and the shape of the paint coating surface.

Part of the test results is shown in FIG. 38 together with three-dimensional charts of their surface profiles. A measuring equipment used to determine the three-dimensional surface profiles was a three-dimensional profile measuring apparatus manufactured by Tokyo Seimitsu (Magnification x:y:z=5:5:5K, Stylus speed=1.5 mm/sec).

Figure 39:
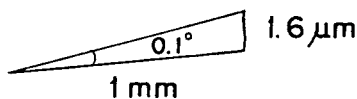

In FIG. 38, the intensity of light is varied in order to facilitate a quick comprehension of the spread of rays of light, and the peak intensity is reduced where the surface has an orange peel (where the specularly reflected light spreads). As can be understood from FIG. 38, in the case where the painted surface has a usual orange peel, the spread of the specularly reflected light falls within ±0.2° from the direction of specular reflection, but in the case where it has no orange peel, the spread falls below ±0.05°. ±0.2° means that the paint surface is inclined about ±0.1° signifying that, if the paint coating has a length of 1 mm, the height is 1.6 μm which coincides with the actual paint shape. (See FIG. 39)

As the foregoing experiments conducted for the purpose for the determination of the light reflecting characteristic have made clear, the change in direction of specular reflection of parallel light beams resulting from the paint surface is merely about ±0.15° from the direction of specular reflection. The spatial resolving power of the light receiving unit is preferred to be, at minimum, about 1/10 of the range (that is, 0.13) of the direction of specular reflection, that is, equal to or smaller than 0.03°. See FIG. 35.

$$0.03° \geq \tan^{-1} P/(1-k)b \quad (VIII)$$

Preferably, it is desired to be 1/100 of the range.

$$0.003° \geq \tan^{-1} P/(1-k)b \quad (IX)$$

Figure 40:
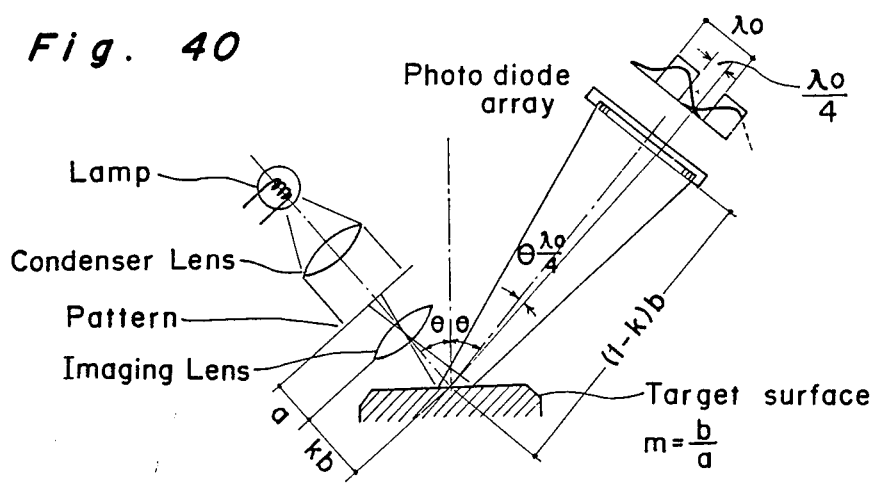
FIG. 40 is a diagram showing limited conditions for the optical system used in the practice of the method and apparatus according to the present invention.

A fifth embodiment of the present invention is a method characterized in that, in the optical system shown in FIG. 40, the cycle of the waveform of the formed image is, when expressed in terms of the angular resolving power, expressed by the following equation;

$$\tan^{-1}(\lambda o/4)/(1-k)b \geq 0.15° \quad (X),$$

wherein $\lambda o$ represents the cycle of the image of the rectangular wave pattern on the image forming plane and $(1-k)b$ represents the distance between the surface to be tested and the image forming plane.

It is however to be noted that $\theta\lambda o/4$ in FIG. 40 is expressed by the following equation.

$$\tan\theta\lambda o/4 = (\lambda o/4)/(1-k)b \quad (XI)$$

The reason for the necessity of the above described limitation in the present invention will be described.

With respect to the waveform of the formed image of plural slits, the contrast is affected as the extent of distortion from the rectangular wave increases, as clearly shown in FIG. 40. The critical inclination of the paint surface to be tested at which any deviation of the direction of specular reflection resulting from the inclination of the paint surface will no longer affect the contrast is as follows.

$$\theta\lambda o/4 = \tan^{-1}(\lambda o/4)/(1-k)b \quad (XII)$$

Accordingly, in view of the results of the experiments shown in FIG. 38, the following conditions must be satisfied.

$$\tan^{-1}(\lambda_0/4)/(1-k)b \geq 0.15° \qquad (XIII)$$

In order to increase the spatial resolving power, it appears that the use of a monolithic linear image sensor is recommendable. If an MOS diode sensor having 512 cells and $p = 28\mu m$ was selected therefor. Thus, from the equation (IX), $(1-k)b = 538$ mm, and from the equation (X), $\lambda_0 = 5.60$ mm, and, accordingly, it appears to be preferred that an image of about 2.5 waves is to be formed on the image sensor.

However, in view of the fact that, in order to carry out the Fourier transformation of the formed image waveform, an integer number of waves is required on the image sensor, the measurement is desired to be applied to a highly glossy surface of a car finish, and the size of the optical system is desired to be reduced for the convenience of transportation, the following parameters were chosen as an example.

$P = 28 \mu m$, $(1-k)b = 477$ mm, and $\lambda_0 = 2.8672$ mm

Accordingly, $p/(1-k)b = 0.000059$ $(\lambda_0/4)/(1-k)b = 0.005$

Figure 41:
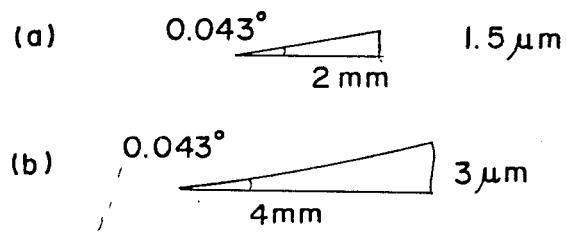

This means that the spatial resolving power of the photodiode array is 0.0034° which corresponds to the detection range up to 0.043° of inclination is shown in FIG. 41.

Although the present invention has fully been described in connection with the preferred embodiments thereof with reference to the accompanying drawings, it is to be noted that various changes and modifications are apparent to those skilled in the art. Such changes and modifications are to be understood as included within the true scope of the present invention unless they depart therefrom.

We claim:

1. A method for the measurement of surface characteristics which comprises the steps of:
    projecting an image of a rectangular wave pattern, which has been reflected from a surface to be tested, onto an image forming plane by means of an image forming optical system to form the image of the pattern on the image forming plane;
    transforming the spatial distribution of the intensity of light falling on the image plane according to the Fourier transformation;
    quantifying the distinctness-of-image glossiness of the surface to be tested according to the intensity of each of power spectra at particular spatial frequencies; and
    individually quantifying the degree of blurring of the image according to the intensity of one of the power spectra which have been obtained from the waveform of the formed image, said one of the power spectra being obtained at a fundamental spatial frequency, and the degree of distortion of the image according to the total sum of the intensity of another one of the power spectra which have been obtained from the waveforms of the image from which the base line intensity has been subtracted, said another one of the power spectra being obtained at the fundamental spatial frequency, plus intensities of the power spectra at plural frequencies which are an integer multiple thereof.

2. A method of quantifying the distinctness-of-image glossiness of the sample surface by projecting an image of a rectangular wave pattern, which has been reflected from a surface to be tested, onto an image forming plane by means of an image forming optical system to form the image of the pattern on the image forming plane, and transforming the spatial distribution of the intensity of light falling on the image plane according to the Fourier transformation to enable the quantification of the distinctness-of-image glossiness in terms of the magnitude of the light power strength at a particular spatial frequency, which method is characterized in that the blurring of the image is quantified by the power strength at a fundamental spatial frequency and the degree of deformation of the image is quantified by a ratio of the sum of the power strengths at a plurality of frequencies which are an integer multiple of the fundamental spatial frequency relative to the power strength at the fundamental spatial frequency.

3. A method of quantifying the distinctness-of-image glossiness of the sample surface by projecting an image of a rectangular wave pattern, which has been reflected from a surface to be tested, onto an image forming plane by means of an image forming optical system to form the image of the pattern on the image forming plane, and transforming the spatial distribution of the intensity of light falling on the image plane according to the Fourier transformation to enable the quantification of the distinctness-of-image glossiness in terms of the magnitude of the light power strength at a particular spatial frequency, which method is characterized in that the degree of blurring of the image is quantified by the power strength at a fundamental spatial frequency and the degree of deformation of the image is quantified by a ratio of the sum of the power strengths at a plurality of frequencies in the vicinity of the fundamental spatial frequency relative to the power strength at the fundamental spatial frequency.

4. The method as claimed in claim 1, 2 or 3, wherein the spatial resolving power of a detecting means for detecting the spatial distribution of the intensity of the light of the formed image is expressed by the following equation in terms of the angular resolving power:

$$0.03° \geq \tan^{-1} P/(1-k)b$$

wherein P represents the spatial distance interval measurable by detecting means and $(1-k)b$ represents the distance between the surface to be tested and the detecting means.

5. The method as claimed in claim 1, 2 or 3, wherein the cycle of the waveform of the formed image is, when expressed in terms of the angular resolving power, expressed by the following equation;

$$\tan^{-1}(\lambda_0/4)/(1-k)b \geq 0.15°$$

wherein $\lambda_0$ represents the cycle of the image of the rectangular wave pattern on the image forming plane and $(1-k)b$ represents the distance between the surface to be tested and the image forming plane.

6. The method as claimed in claim 4, wherein the cycle of the waveform of the formed image is, when expressed in terms of the angular resolving power, expressed by the following equation;

$$\tan^{-1}(\lambda_0/4)/(1-k)b \geqq 0.15°$$

wherein $\lambda_0$ represents the cycle of the image of the rectangular wave pattern on the image forming plane and $(1-k)b$ represents the distance between the surface to be tested and the image forming plane.

7. The method as claimed in any of claims 1-3, wherein the rectangular wave pattern has a pitch within the range of 0.5 to 20 mm$^{-1}$ when expressed in terms of the spatial frequency.

8. The method as claimed in any of claims 1-3, wherein the magnification of the formed image is within the range of 0.5 to 20 times.

9. The method as claimed in any of claims 1-3, wherein, in a plane generally perpendicular to the surface to be tested and containing an optical axis of the optical system, which includes an illuminating optical means, the rectangular wave pattern and the image forming optical means for projecting and forming the image of the rectangular wave pattern, and an optical axis of the photoelectric converting means for converting a spatial distribution of the intensity of light of the formed image waveform on the image forming plane into an electric signal, each of the angle of projection defined between the plane normal to the surface to be tested and the optical axis of the optical system containing the illuminating optical means and the rectangular wave pattern and the image forming optical means, and the light receiving angle defined between the plane normal to the surface to be tested and the photoelectric converting means for converting a spatial distribution of the intensity of light of the formed image waveform on the image forming plane into an electric signal is within the range of 20° to 80°.

10. The method as claimed in any of claims 1-3, wherein the distance between the principal point of an image forming lens included in the image forming optical means and the surface to be tested is within the range $\phi$0.1 to 0.9 times the distance between the principal point of the image forming lens and the image forming plane.

11. An apparatus for measuring surface characteristics which comprises:

an illuminating optical means for illuminating a rectangular wave pattern;

an image forming optical system for projecting an image of the rectangular wave pattern, reflected from a surface to be tested, onto an image forming plane to form the image of the rectangular wave pattern on an image forming plane;

a photoelectric converting means for converting a spatial distribution of the intensity of light of the formed image waveform on the image forming plane into an electric signal; and a data processing means for transforming a spatial light intensity distribution signal from the photoelectric converting means according to the Fourier transformation thereby to calculate the intensity of a power spectrum at a particular spatial frequency;

said data processing means being operable to calculate the intensity of a power spectrum at a fundamental spatial frequency of the waveform of the formed image and also the sum of the intensity of the power spectrum at the fundamental spatial frequency of the waveform of the formed image from which the base line intensity has been subtracted and the intensity of the power spectrum at plural spatial frequencies which are an integer multiple of the fundamental spatial frequency.

12. An apparatus for measuring a surface characteristic which comprises an illuminating optical means for illuminating a rectangular wave pattern, an image forming optical system for projecting an image of the rectangular wave pattern, reflected from a surface to be tested, onto an image forming plane to form the image of the rectangular wave pattern on an image forming plane, a photoelectric converting means for converting a spatial distribution of the intensity of light of the formed image waveform on the image forming plane into an electric signal, and a data processing means for transforming a spatial light intensity distribution signal from the photoelectric converting means according to the Fourier transformation thereby to calculate the intensity of a power spectrum at a particular spatial frequency so that the surface characteristic can be measured from the power spectrum calculated by the data processing means, which apparatus is characterized in that there is provided a calculating means for calculating the power spectrum at a fundamental spatial frequency and also the sum of the power strengths at a plurality of frequencies which are an integer multiple of the fundamental spatial frequency relative to the power strength at the fundamental spatial frequency.

13. An apparatus for measuring a surface characteristic which comprises an illuminating optical means for illuminating a rectangular wave pattern, an image forming optical system for projecting an image of the rectangular wave pattern, reflected from a surface to be tested, onto an image forming plane to form the image of the rectangular wave pattern on an image forming plane, a photoelectric converting means for converting a spatial distribution of the intensity of light of the formed image waveform on the image forming plane into an electric signal, and a data processing means for transforming a spatial light intensity distribution signal from the photoelectric converting means according to the Fourier transformation thereby to calculate the intensity of a power spectrum at a particular spatial frequency so that the surface characteristic can be measured from the power spectrum calculated by the data processing means, which apparatus is characterized in that there is provided a calculating means for calculating the power strength at a fundamental spatial frequency and the ratio of the sum of the power strengths at a plurality of frequencies in the vicinity of the fundamental spatial frequency relative to the power strength at the fundamental spatial frequency.

14. The apparatus as claimed in claim 11, 12 or 13, wherein the spatial resolving power of a detecting means for detecting the spatial distribution of the intensity of the light of the formed image is, when expressed in terms of the angular resolving power, expressed by the following equation;

$$0.03° \geqq \tan^{-1} P/(1-k)b$$

wherein P represents the spatial distance interval measurable by the detecting means and $(1-k)b$ represents the distance between the surface to be tested and the detecting means.

15. The apparatus as claimed in claim 11, 12 or 13, wherein the cycle of the waveform of the formed image is, when expressed in terms of the angular resolving power, expressed by the following equation;

$$\tan^{-1}(\lambda o/4)/(1-k) \geq 0.15°$$

wherein λo represents the cycle of the image of the rectangular wave pattern on the image forming plane and (1−k)b represents the distance between the surface to be tested and the image forming plane.

16. The apparatus as claimed in claim 14, wherein the cycle of the waveform of the formed image is, when expressed in terms of the angular resolving power, expressed by the following equation;

$$\tan^{-1}(\lambda o/4)/(1-k) \geq 0.15°$$

wherein λo represents the cycle of the image of the rectangular wave pattern on the image forming plane and (1−k)b represents the distance between the surface to be tested and the image forming plane.

17. The apparatus as claimed in any of claims 11–13, further comprising a control means for controlling the intensity of light of the illuminating optical means.

18. The apparatus as claimed in any of claims 11–13, wherein the rectangular wave pattern has a pitch within the range 0.5 to 20 mm$^{-1}$ in terms of the spatial frequency.

19. The apparatus as claimed in any of claims 11–13, wherein the rectangular wave pattern comprises a substrate formed with rectangular wave patterns having different pitches.

20. The apparatus as claimed in any claims 11–13, further comprising a mechanism provided with a plurality of rectangular waver patterns of different pitches and operable to change the rectangular wave pattern used to project and form the image.

21. The apparatus as claimed in any of claims 11–13, wherein the magnification of the formed image is within the range of 0.5 to 20 times.

22. The apparatus as claimed in any of claims 11–13, further comprising a mechanism for adjusting the image forming magnification employed to form the image of the pattern on the image forming plane to a value within the range of 0.5 to x20.

23. The apparatus as claimed in any of claims 11–13, wherein the distance between the principal point of an image forming lens included in the image forming optical means and the surface to be tested is within the range of 0.1 to 0.9 times the distance between the principal point of the image forming lens and the image forming plane.

24. The apparatus as claimed in any of claims 11–13, further comprising means for adjusting the distance between the principal point of the image forming lens and the surface to be tested to a value within the range of 0.1 to 0.9 times the distance between the principal point of the image forming lens and the image forming plane.

25. The apparatus as claimed in any of claims 11–13, wherein, in a plane generally perpendicular to the surface to be tested and containing an optical axis of the optical system, which includes an illuminating optical means, the rectangular wave pattern and the image forming optical means, and an optical axis of the image of the rectangular wave pattern, each of the angle of projection defined between the plane normal to the surface to be tested and the optical axis of the optical system containing the illuminating optical means, the rectangular wave pattern and the image forming optical means, and the light receiving angle defined between the plane normal to the surface to be tested and the optical axis of the image of the rectangular wave pattern is within the range of 20° to 80°.

26. The apparatus as claimed in any of claims 11–13, further comprising a mechanism for adjusting the angle formed between the same optical axis on which the illuminating optical means and the image of the rectangular wave pattern are located and the direction perpendicular to the surface to be tested to a value within the range of 20° to 80°.

27. The apparatus as claimed in any of claims 11–13, wherein the photoelectric converting means is a single-cell photoelectric tranducing element provided with a perforated light shielding mask positioned in front of a light receiving surface thereof, said element being so designed as to mechanically scan the image forming plane.

28. The apparatus as claimed in any of claims 11–13, wherein the photoelectric converting means is a linear image sensor provided with a circuit for varying an electronically scanning speed.

29. The apparatus as claimed in any of claims 11–13, wherein the photoelectric converting means is comprised of a linear image sensor and a single-cell photoelectric tranducing element provided with a light shielding mask having an opening defined therein, said light shielding mask being positioned in front of a light receiving surface thereof.

30. The apparatus as claimed in any of claims 11–13, further comprising a mechanism for automatically adjusting one of the surface to be tested, the image forming optical means and the photoelectric element to a focused position.

31. The apparatus as claimed in any of claims 11–13, further comprising means for controlling any one of the temperatures, humidity and flow of air inside a space in which the surface to be tested is located.

* * * * *